(12) United States Patent
Ogino et al.

(10) Patent No.: US 11,692,624 B2
(45) Date of Patent: Jul. 4, 2023

(54) SHIFT DEVICE

(71) Applicant: AISIN CORPORATION, Kariya (JP)

(72) Inventors: Atsuto Ogino, Kariya (JP); Kota Ishikawa, Kariya (JP); Kentaro Baba, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/650,146

(22) Filed: Feb. 7, 2022

(65) Prior Publication Data
US 2022/0307594 A1 Sep. 29, 2022

(30) Foreign Application Priority Data

Mar. 26, 2021 (JP) .................. 2021-053671

(51) Int. Cl.
| | |
|---|---|
| *F16H 61/32* | (2006.01) |
| *F16H 59/08* | (2006.01) |
| *F16H 63/38* | (2006.01) |
| *F16H 61/24* | (2006.01) |
| *F16H 61/00* | (2006.01) |

(52) U.S. Cl.
CPC ............ *F16H 61/32* (2013.01); *F16H 59/08* (2013.01); *F16H 63/38* (2013.01); *F16H 2061/0087* (2013.01); *F16H 2061/247* (2013.01); *F16H 2061/326* (2013.01)

(58) Field of Classification Search
CPC ............... F16H 61/32; F16H 61/0204; F16H 2061/0087; F16H 2061/247; F16H 2061/326; F16H 59/08; F16H 2059/081; F16H 63/3433; F16H 63/38
See application file for complete search history.

(56) References Cited

U.S. PATENT DOCUMENTS

| | | | | |
|---|---|---|---|---|
| 2002/0019287 A1* | 2/2002 | Ebashi | ..................... | F16H 61/32 475/254 |
| 2005/0257637 A1* | 11/2005 | Osamura | ................. | F16H 61/32 74/473.1 |
| 2012/0123653 A1* | 5/2012 | Kimura | ................. | B60W 10/06 701/54 |
| 2017/0307072 A1* | 10/2017 | Yamada | .................. | F16H 61/32 |
| 2020/0011414 A1* | 1/2020 | Sakaguchi | .............. | F16H 61/32 |
| 2020/0132191 A1 | 4/2020 | Cho | | |

* cited by examiner

*Primary Examiner* — Timothy Hannon
(74) *Attorney, Agent, or Firm* — Oblon, McClelland, Maier & Neustadt, L.L.P.

(57) ABSTRACT

A shift device includes: a shift switching member including a plurality of valley portions corresponding to shift positions; a motor that includes a rotor and a stator and that is configured to drive the shift switching member; and a positioning member configured to establish the shift positions in a state in which the positioning member is fitted into any one of the plurality of valley portions of the shift switching member. The shift device is configured to learn the shift positions based on a change amount of a load torque applied to the motor while the positioning member is moved to continuously pass through the plurality of valley portions.

6 Claims, 17 Drawing Sheets

DRIVING FORCE TRANSMITTABLE STATE

DRIVING FORCE NON-TRANSMISSION STATE

ESTIMATION OF DISTURBANCE TORQUE

MODIFICATION

SHIFT DEVICE

CROSS REFERENCE TO RELATED APPLICATIONS

This application is based on and claims priority under 35 U.S.C. § 119 to Japanese Patent Application 2021-053671, filed on Mar. 26, 2021, the entire content of which is incorporated herein by reference.

TECHNICAL FIELD

This disclosure relates to a shift device, and more particularly, to a shift device including a shift switching member including a plurality of valley portions.

BACKGROUND DISCUSSION

In the related art, a shift device including a shift switching member including a plurality of valley portions has been known (for example, see US Patent Application Publication NO. 2020/0132191 specification (Reference 1)).

Reference 1 discloses a shift-by-wire system including a detent plate including a plurality of (four) valley portions. The shift-by-wire system includes a motor, a detent spring, a current sensor, and a controller. The detent plate is a shift switching unit that is driven by a motor to switch a shift range (a P position, an N position, an R position, and a D position). The detent spring fixes the shift range of the detent plate. The current sensor detects a current generated from the motor in the shift range in which a position is switched from the P position to the D position.

The controller according to Reference 1 executes control for learning a position of the shift range based on a current value of the current that is generated from the motor and that is detected by the current sensor. Specifically, the controller executes control for learning, as the R position and the N position in the shift range, a portion where a small current value (a valley portion of the current value) of the current value detected by the current sensor is detected. The controller executes control for learning the P position by offsetting the learned R position by a predetermined value and control for learning the D position by offsetting the learned N position by a predetermined value.

However, in the shift-by-wire system according to Reference 1, although the control for learning, as the R position and the N position in the shift range, a position where the small current value (the valley portion of the current value) generated from the motor is detected is executed, since noise due to electromagnetic waves is likely to be generated in the current generated from the motor, there is a disadvantage that it is difficult to accurately learn the R position and the N position. Therefore, since it is difficult to accurately learn the R position and the N position in the shift range, it is also difficult to accurately learn the P position learned by offsetting the learned R position by a predetermined value and the D position learned by offsetting the learned N position by a predetermined value. Therefore, in the shift-by-wire system according to Reference 1, there is a problem that it is difficult to learn a shift position with high accuracy.

A need thus exists for a shift device which is not susceptible to the drawback mentioned above.

SUMMARY

A shift device according to an aspect of this disclosure includes: a shift switching member including a plurality of valley portions corresponding to shift positions; a motor that includes a rotor and a stator and that is configured to drive the shift switching member; and a positioning member configured to establish the shift positions in a state in which the positioning member is fitted into any one of the plurality of valley portions of the shift switching member. The shift device is configured to learn the shift positions based on a change amount of a load torque applied to the motor while the positioning member is moved to continuously pass through the plurality of valley portions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

First Embodiment

A configuration of a shift device 100 will be described with reference to FIGS. 1 to 16. In the specification of the present application, the term "a rotation angle of a motor" and the term "a rotation angle of a rotor" have the same meaning.

Figure 1:
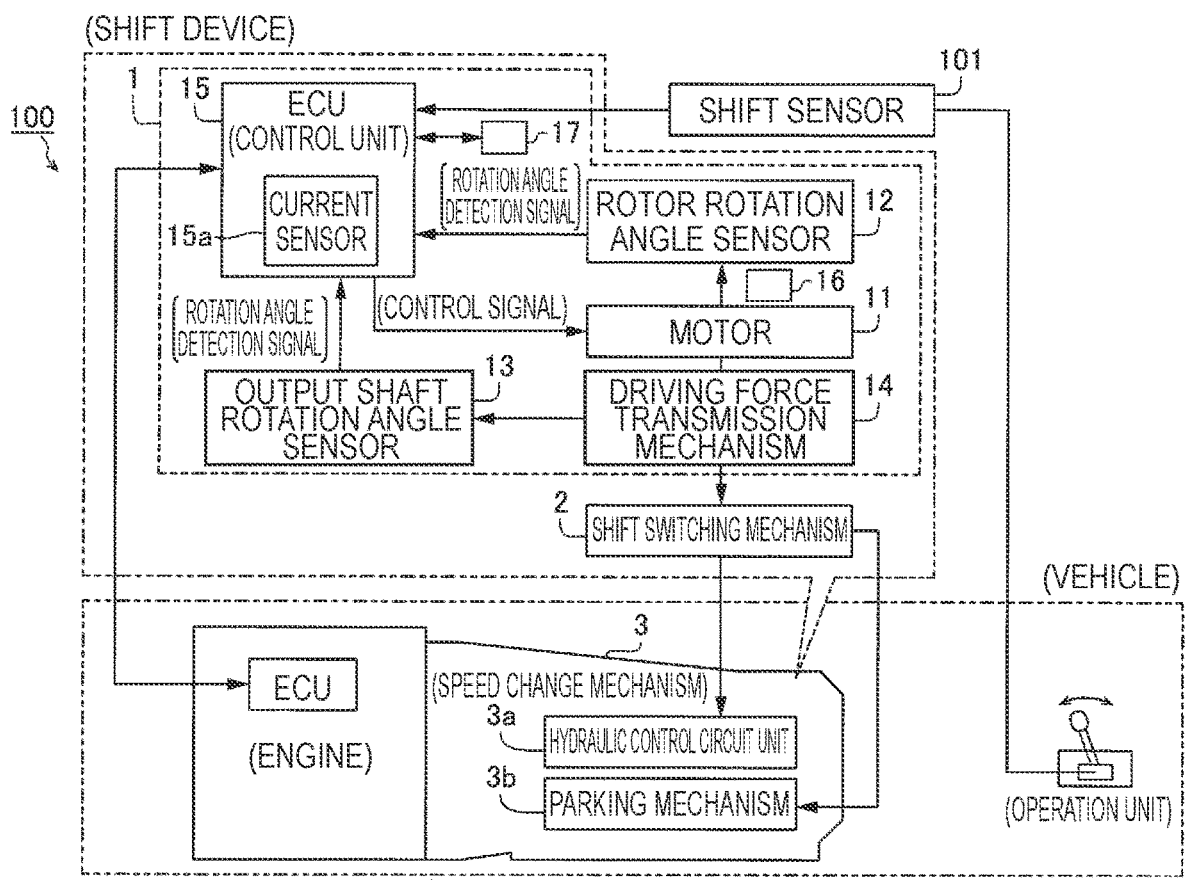
FIG. 1 is a block diagram showing a control configuration of a shift device according to a first embodiment.

The shift device 100 is mounted on a vehicle such as an automobile. As shown in FIG. 1, in the vehicle, when an occupant (a driver) performs a shift switching operation with an operation unit such as a shift lever (or a shift switch), a speed change mechanism 3 is subjected to electrical shift switching control. That is, a position of the shift lever is input to a shift device 100 side via a shift sensor 101 provided in the operation unit. Then, based on a control signal transmitted from a dedicated ECU 15 provided in the shift device 100, the speed change mechanism 3 is switched to any of shift positions of a parking (P) position, a reverse (R) position, a neutral (N) position, and a drive (D) position corresponding to a shift operation of the occupant. Such shift switching control is called shift-by-wire (SBW).

The shift device 100 includes an actuator unit 1 and a shift switching mechanism 2 driven by the actuator unit 1. The shift switching mechanism 2 is mechanically connected to a manual spool valve (not shown) of a hydraulic valve body in a hydraulic control circuit unit 3a and a parking mechanism 3b in the speed change mechanism 3. A shift state (the P position, the R position, the N position, and the D position) of a transmission is mechanically switched by driving the shift switching mechanism 2.

The actuator unit 1 includes a motor 11, a rotor rotation angle sensor 12, an output shaft rotation angle sensor 13, a driving force transmission mechanism 14 (an example of a "transmission mechanism" in the claims), an electronic control unit (ECU) 15, a temperature detection unit 16, and a storage unit 17.

The ECU 15 is a substrate component in which electronic components are mounted on a substrate. The substrate component is accommodated in a box-shaped main body 143b fixed to a case of the speed change mechanism 3. The ECU 15 includes a current sensor 15a that measures a current value supplied to the motor 11. The current sensor 15a measures a current value of each of a plurality of phases (a U phase, a V phase, and a W phase). The current sensor 15a is attached to the ECU 15.

The temperature detection unit 16 detects a temperature of the motor 11. The temperature detection unit 16 detects an environmental temperature (an ambient temperature) near the motor 11 in an accommodation space inside the actuator unit 1. The storage unit 17 is a storage device including memories such as a read only memory (ROM) and a random access memory (RAM). The storage unit 17 is provided inside the actuator unit 1.

Figure 2:
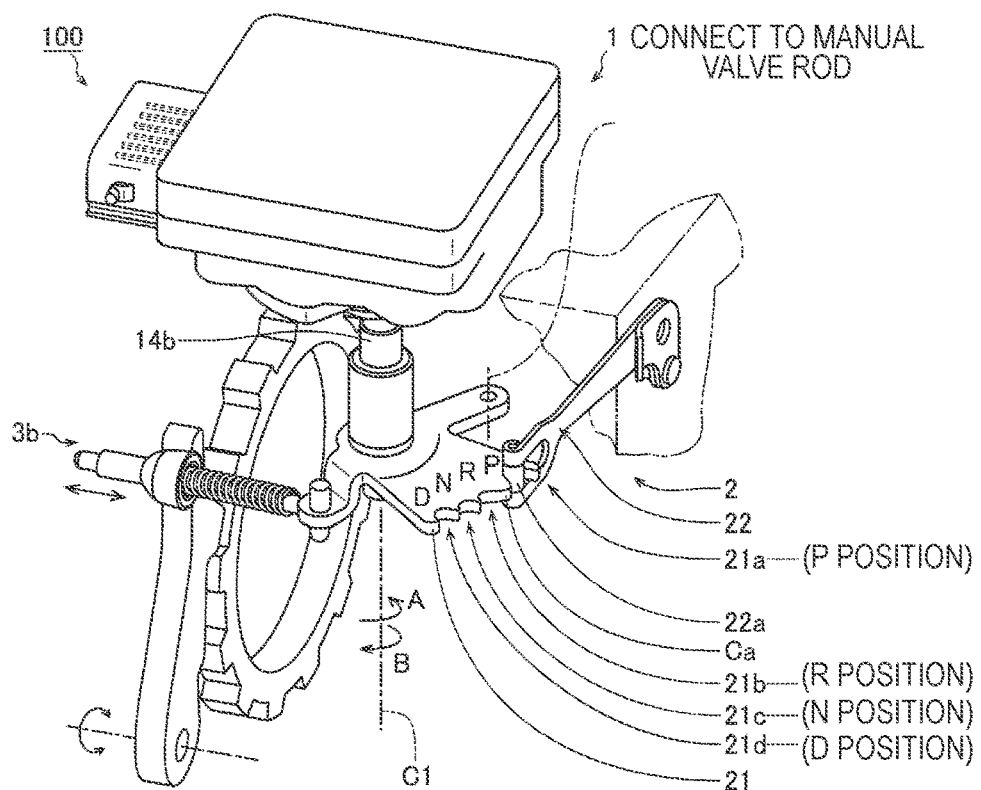
FIG. 2 is a perspective view schematically showing an overall configuration of the shift device according to the first embodiment.

As shown in FIG. 2, the shift switching mechanism 2 includes a detent plate 21 (an example of a "shift switching member" in the claims) and a detent spring 22 (an example of a "positioning member" in the claims). The detent spring 22 holds the detent plate 21 at rotation angle positions corresponding to the P position, the R position, the N position, and the D position, respectively.

Figure 3:
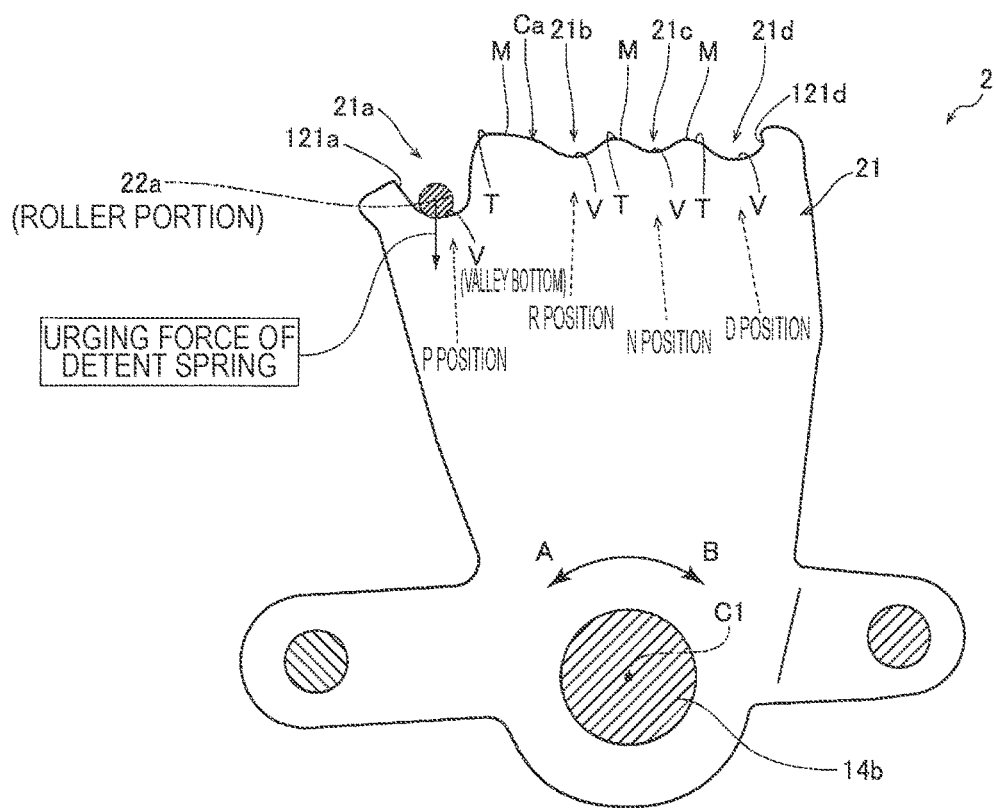
FIG. 3 is a view showing a structure of a detent plate constituting the shift device according to the first embodiment.

As shown in FIG. 3, the detent plate 21 includes a plurality of (four) valley portions 21a, 21b, 21c, and 21d corresponding to the shift positions (the P position, the R position, the N position, and the D position). The valley portion 21a, the valley portion 21b, the valley portion 21c, and the valley portion 21d form a cam surface Ca having a continuous undulating shape on the detent plate 21. Adjacent valley portions (for example, the valley portion 21a and the valley portion 21b, the valley portion 21b and the valley portion 21c, and the like) are separated by a mountain portion M having one top portion T. A base end portion (see FIG. 2) of the detent spring 22 is fixed to a casing (see FIG. 2) of the speed change mechanism 3, and a roller portion 22a is attached to a free end (see FIG. 2) side of the detent spring 22. The roller portion 22a of the detent spring 22 constantly presses the cam surface Ca (the position of any one of the valley portion 21a, the valley portion 21b, the valley portion 21c, the valley portion 21d, and the mountain portion M). Further, the detent spring 22 establishes the shift position in a state in which the detent spring 22 is fitted into any of the plurality of valley portions 21a, 21b, 21c, and 21d.

As shown in FIG. 3, the valley portion 21a formed on an outermost end side is provided with a wall portion 121a that prevents the detent spring 22 from moving beyond the valley portion 21a. The valley portion 21d formed on an outermost end side is provided with a wall portion 121d that prevents the detent spring 22 from moving beyond the valley portion 21d. Specifically, the wall portion 121a is provided at the valley portion 21a formed at an end portion of the detent plate 21 in a direction of an arrow A. The wall portion 121d is provided at the valley portion 21d formed at an end portion of the detent plate 21 in a direction of an arrow B.

As shown in FIG. 2, the detent plate 21 is fixed to a lower end portion (a Z2 side) of an output shaft 14b to be described later, and the detent plate 21 is rotated around a rotation axis C1 integrally with the output shaft 14b. Accordingly, in the detent spring 22, the roller portion 22a slides along the cam surface Ca as the detent plate 21 rotates (swings) forward and reverse in the direction of the arrow A or the direction of the arrow B, so that the roller portion 22a is fitted into any of the valley portion 21a, the valley portion 21b, the valley portion 21c, and the valley portion 21d by an urging force of the detent spring 22. In the detent spring 22, the roller portion 22a is selectively fitted into any of the valley portion 21a, the valley portion 21b, the valley portion 21c, and the valley portion 21d of the detent plate 21, so that the detent plate 21 is held at a rotation angle position corresponding to the P position, the R position, the N position, or the D position. Accordingly, the P position, the R position, the N position, or the D position is individually established.

Next, a detailed configuration of the actuator unit 1 will be described.

Figure 4:
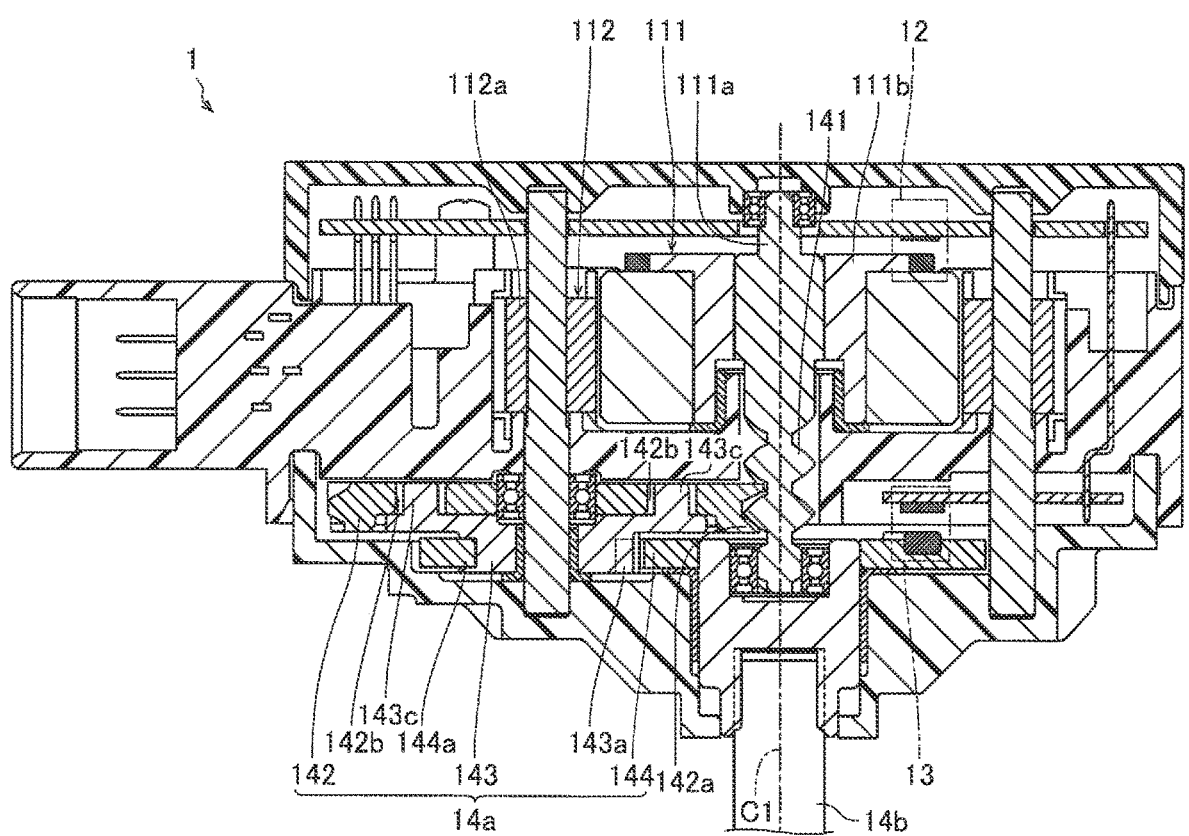
FIG. 4 is a cross-sectional view showing an actuator unit constituting the shift device according to the first embodiment.

As shown in FIG. 4, the motor 11 includes a rotor 111 that is supported rotatably with respect to a motor housing and a stator 112 that faces the rotor 111 with a magnetic gap around the rotor 111. The motor 11 drives the detent plate 21.

A surface magnet type (SPM) three-phase motor in which a permanent magnet is incorporated in a surface of the rotor 111 is used as the motor 11. Specifically, the rotor 111 includes a shaft pinion 111a and a rotor core 111b.

The shaft pinion 111a of the rotor 111 and the output shaft 14b are rotated around the same rotation axis Cl. In the shaft pinion 111a, a gear portion 141 having a gear groove formed in a helical shape is integrally formed in an outer peripheral region extending from a central portion to the lower end portion (the Z2 side).

The stator 112 includes a stator core 112a fixed in a motor chamber of the motor housing, and an exciting coil (not shown) of a plurality of phases (a U phase, a V phase and a W phase) that generates a magnetic force by being energized.

The rotor rotation angle sensor 12 detects a rotation angle of the motor 11. For example, the rotor rotation angle sensor 12 includes a magneto resistive (MR) sensor.

The output shaft rotation angle sensor 13 detects a rotation angle of the output shaft 14b. For example, the output shaft rotation angle sensor 13 includes a Hall element. A rotational position (an output angle) of the output shaft 14b is detected as a continuous output shaft angle.

Figure 5:
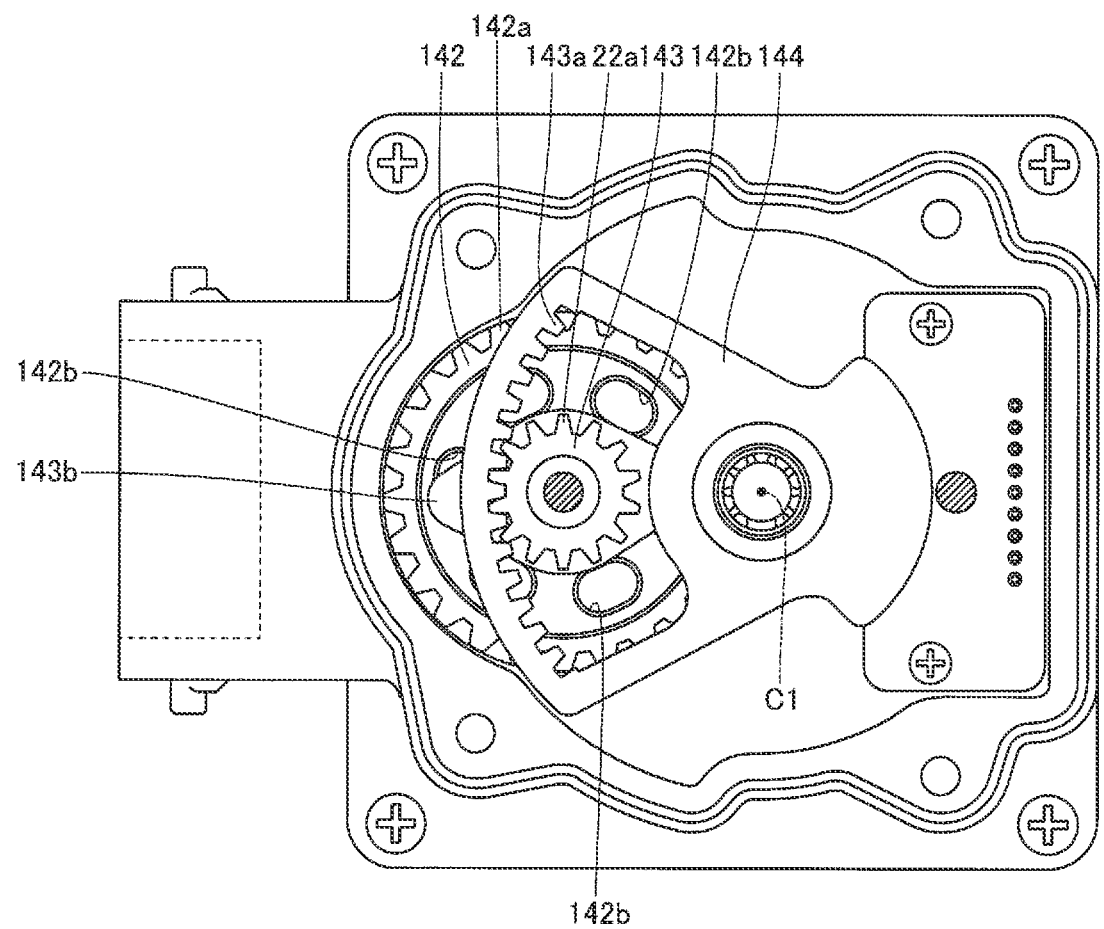
FIG. 5 is a view showing an internal structure of a speed reducing mechanism in a state in which a gear housing is removed from a main body in the actuator unit constituting the shift device according to the first embodiment.

As shown in FIGS. 4 and 5, the driving force transmission mechanism 14 transmits a driving force of the motor 11 to the detent plate 21. The driving force transmission mechanism 14 includes the speed reducing mechanism 14a and the output shaft 14b.

The speed reducing mechanism 14a rotates the detent plate 21 in a state in which a rotation speed transmitted from a motor 11 side is reduced.

Specifically, the speed reducing mechanism 14a includes the gear portion 141 of the rotor 111, an intermediate gear 142 including a gear portion 142a that meshes with the gear portion 141, an intermediate gear 143 that is provided on a lower surface side (the Z2 side) at the same axis as the intermediate gear 142 and that engages with the intermediate gear 142, and a final gear 144 including a gear portion 144a that meshes with a gear portion 143a of the intermediate gear 143.

Figure 6:
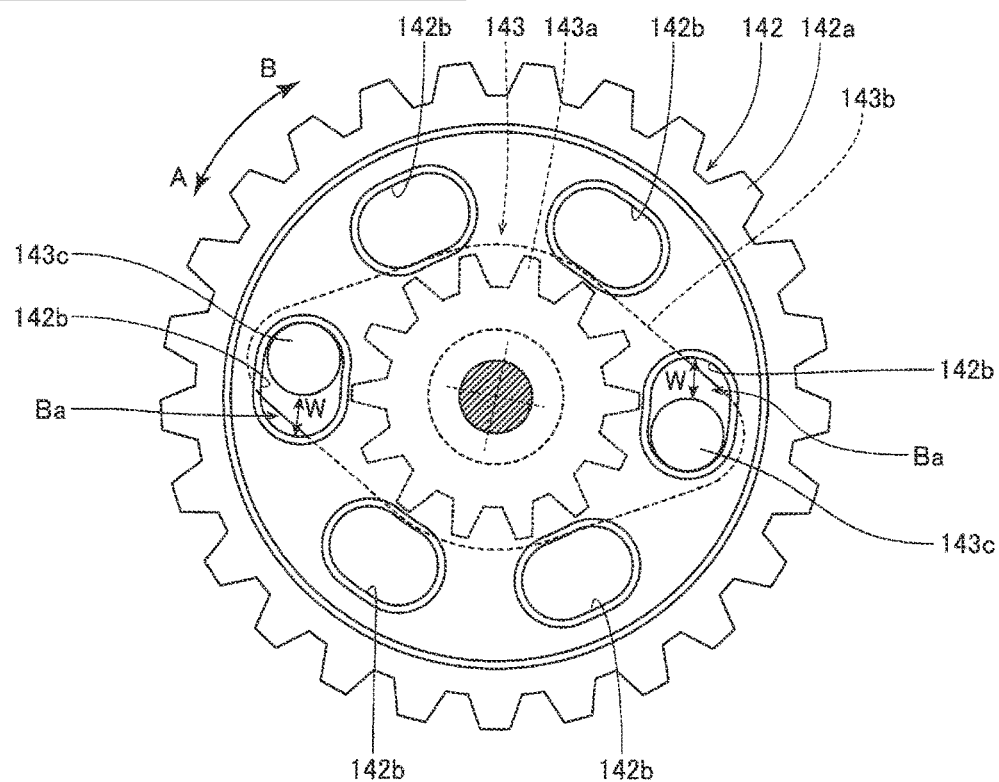
FIG. 6 is a view showing an engaged state (a driving force transmittable state) of an intermediate gear in the actuator unit constituting the shift device according to the first embodiment.
Figure 7:
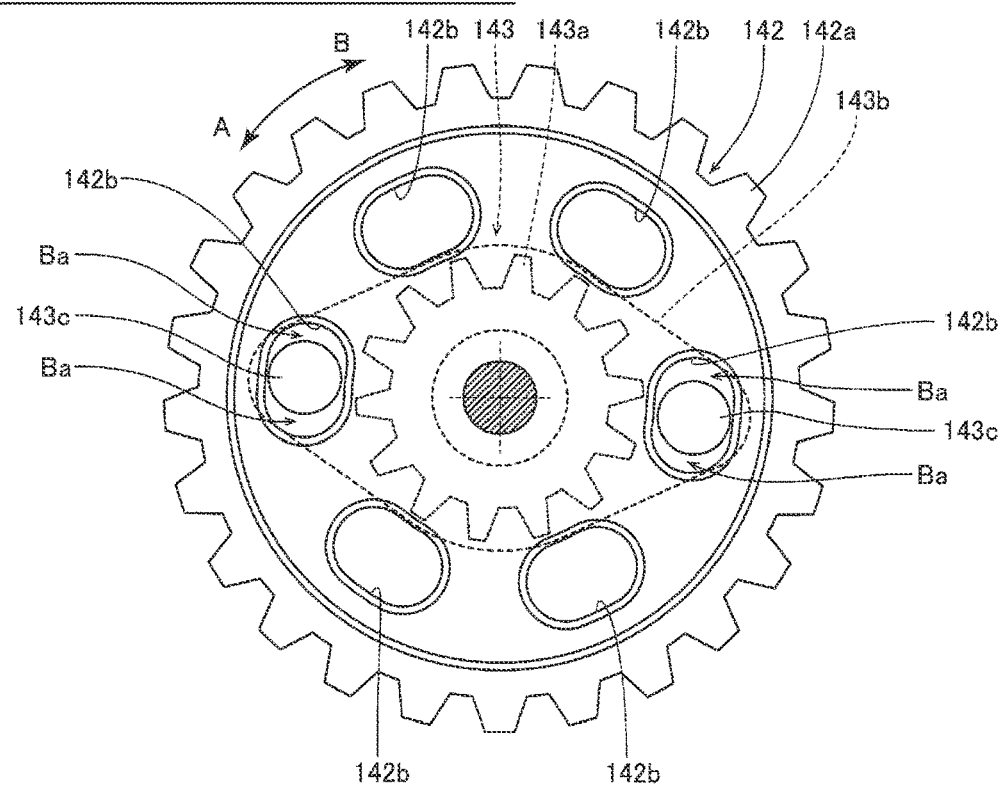
FIG. 7 is a view showing an engaged state (a driving force non-transmission state) of the intermediate gear in the actuator unit constituting the shift device according to the first embodiment.

As shown in FIGS. 6 and 7, the intermediate gear 142 is formed with a plurality of (six) elongated holes 142b having a long diameter extending along a circumferential direction between a rotation central portion and an outer peripheral portion (the gear portion 142a). The plurality of elongated holes 142b are arranged at intervals of 60 degrees in the circumferential direction. The intermediate gear 143 includes an elliptical main body portion 143b provided with the gear portion 143a, and is provided with a plurality of (two) cylindrical engaging convex portions 143c protruding upward from an upper surface (a Z1 side) of the main body portion 143b opposite to the gear portion 143a. The engaging convex portions 143c are provided at peripheral edge portions on both sides of the main body portion 143b in a long diameter direction. In a state in which the intermediate gear 143 is adjacent to the intermediate gear 142 from the lower side toward the upper side (the Z1 side), each of the engaging convex portions 143c arranged at an interval of 180° is inserted (engaged) into a corresponding one of the two elongated holes 142b of the intermediate gear 142.

The engaging convex portion 143c is fitted to the elongated hole 142b of the intermediate gear 142 with a backlash Ba having a predetermined size (a length in the circumferential direction). That is, relatively free rotation between the intermediate gear 142 and the intermediate gear 143 is allowed by the backlash Ba (a predetermined angular width) in the circumferential direction generated in the engaging convex portion 143c and the elongated hole 142b that are fitted to each other. FIG. 6 shows a state in which the driving force can be transmitted from the intermediate gear 142 to the intermediate gear 143, and FIG. 7 shows a state in which the driving force cannot be transmitted from the intermediate gear 142 to the intermediate gear 143.

The output shaft 14b outputs the driving force of the motor 11 to the detent plate 21. The output shaft 14b is connected to an output side of the speed reducing mechanism 14a. The output shaft 14b is connected to an input side of the detent plate 21. Accordingly, the output shaft 14b and the detent plate 21 integrally operate.

Next, relation between a movement of the shift position and an output value of the output shaft rotation angle sensor 13 and an output value of the rotor rotation angle sensor 12 will be described.

Figure 8:
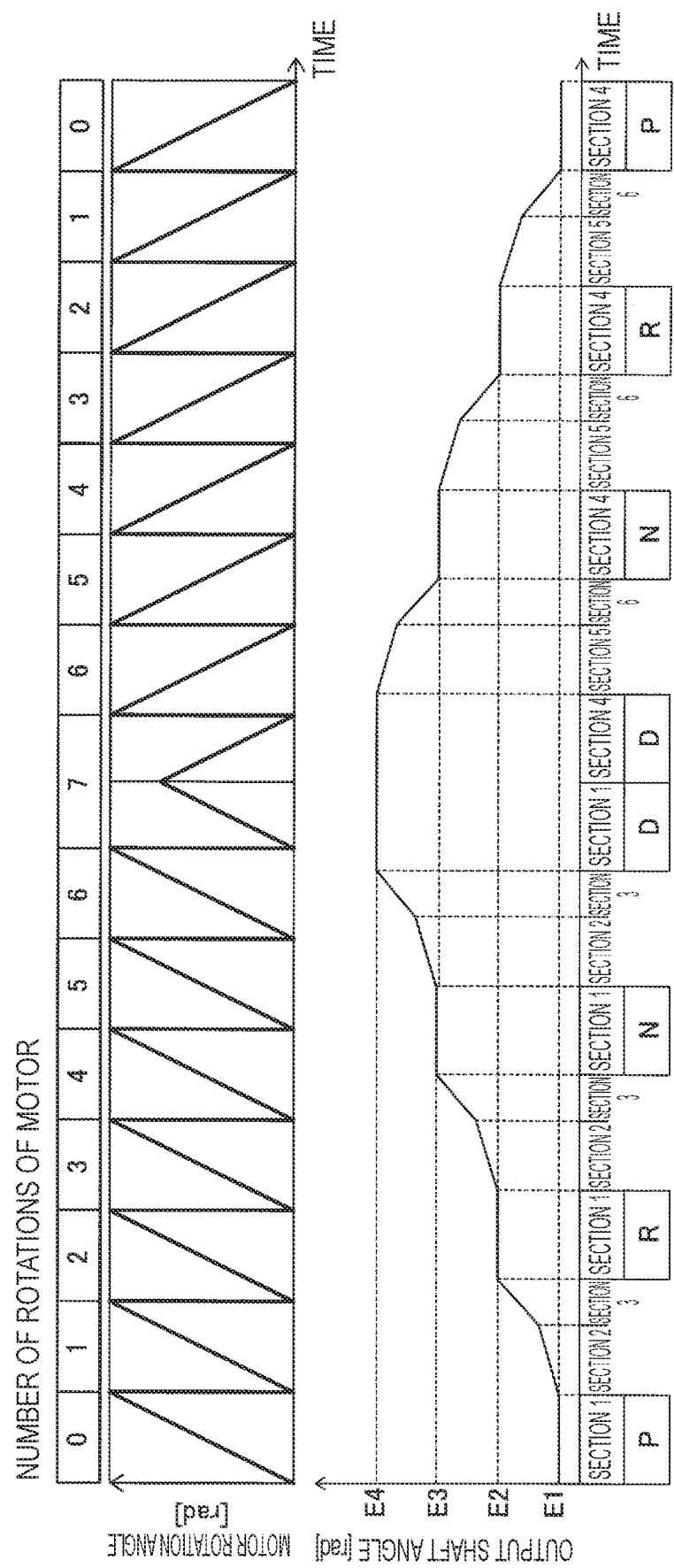
FIG. 8 is a diagram showing relation among an output value (an output shaft rotation angle) of an output shaft rotation angle sensor, an output value (a motor rotation angle) of a rotor rotation angle sensor, and the number of rotations of a motor in the shift device according to the first embodiment.

As shown in FIG. 8, as the number of rotations (0 times, 1 time, 2 times, . . . , 7 times) of the motor 11 increases, the detent plate 21 connected to the output shaft 14b rotates such that the shift position changes in an order of the P position, the R position, the N position, and the D position. At this time, the detent spring 22 is fitted into the valley portion 21a, the valley portion 21b, the valley portion 21c, and the valley portion 21d in this order. Further, the output value of the output shaft rotation angle sensor 13 increases as the number of rotations of the motor 11 increases.

Figure 9:
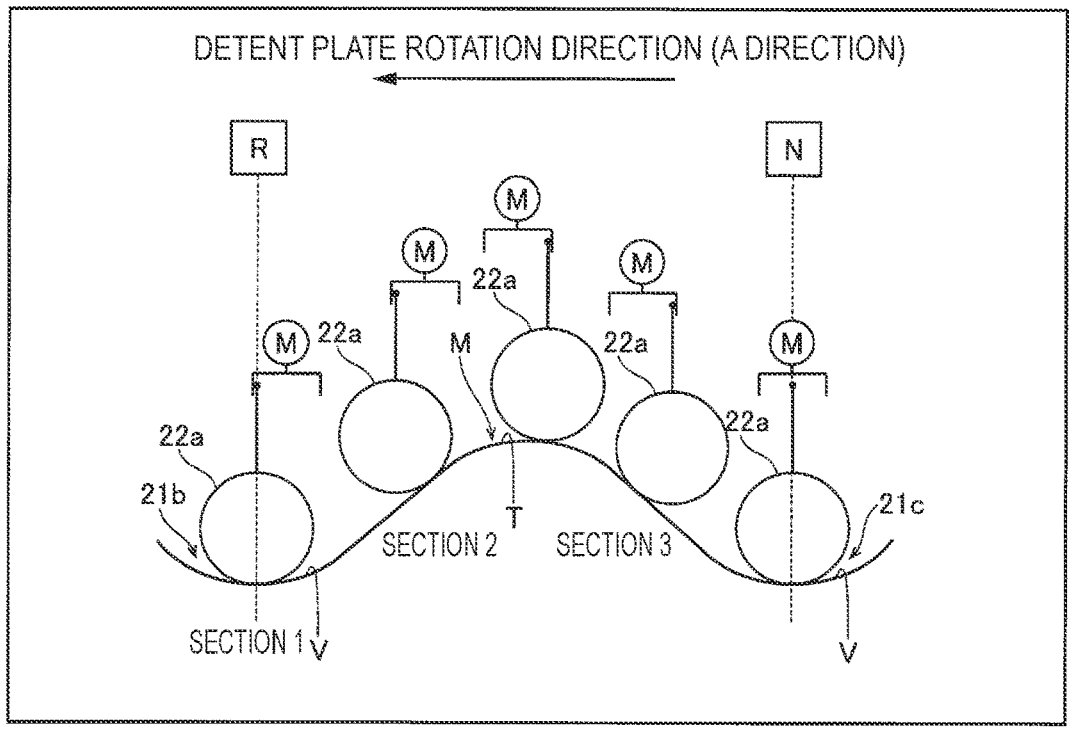
FIG. 9 is a schematic diagram showing a state in which a roller portion of the shift device according to the first embodiment is moved from an R position toward an N position.

For example, as shown in FIGS. 8 and 9, it is assumed that the roller portion 22a is currently fitted into the valley portion 21b (the R position) (a section 1). By driving the motor 11 (see FIG. 1), the detent plate 21 is rotated in the direction of the arrow A via the speed reducing mechanism 14a (see FIG. 1). A predetermined amount of backlash Ba (see FIG. 7) is provided between the intermediate gear 142 and the intermediate gear 143. Therefore, in a state in which the roller portion 22a is completely fitted into a valley bottom V of the valley portion 21b, the engaging convex portion 143c is engaged with an inside of the elongated hole 142b by utilizing the backlash Ba so as not to transmit the driving force even though the intermediate gear 142 is rotated with a rotation of the rotor 111, and thus the intermediate gear 143 is not rotated. As a result, in the section 1, while the rotation angle (rad) of the motor 11 detected by the rotor rotation angle sensor 12 (see FIG. 1) linearly increases, the rotation angle (the output shaft angle (rad)) of the output shaft 14b detected by the output shaft rotation angle sensor 13 (see FIG. 1) is constant.

Then, in a section 2, one side end portion of the elongated hole 142b of the intermediate gear 142 is engaged with the engaging convex portion 143c of the intermediate gear 143 so as to transmit the driving force, and thus the driving force of the motor 11 is transmitted to the output shaft 14b (see FIG. 2) via the gear portion 141, the intermediate gear 142, the intermediate gear 143, and the final gear 144 (see FIG. 4). Further, as the detent plate 21 rotates in the direction of the arrow A, the roller portion 22a moves so as to ascend a slope of the valley portion 21b (the R position) on the valley portion 21c (the N position) side toward the mountain portion M. In the section 2, the rotation angle (the rad) of the motor 11 detected by the rotor rotation angle sensor 12 (see FIG. 1) linearly increases. The rotation angle (the rad) of the output shaft 14b detected by the output shaft rotation angle sensor 13 (see FIG. 1) increases at a constant rate.

In a section 3, after the roller portion 22a climbs over the mountain portion M at a boundary between the valley portion 21b (the R position) and the valley portion 21c (the N position), the detent plate 21 is rotated ahead of the motor 11 (the intermediate gear 142). That is, the detent plate 21 is always urged toward the valley portion 21b by the roller portion 22a, and thus the detent plate 21 is rotated by this urging force ahead of the motor 11 within a range of a size of the backlash Ba of the elongated hole 142b. Then, the roller portion 22a is dropped toward the valley bottom V of the valley portion 21c (see the section 3 in FIG. 9). At this time, while the rotation angle of the motor 11 increases, the rotation angle (the rad) of the output shaft 14b rapidly increases as the roller portion 22a drops (is suctioned) into the valley bottom V.

An operation of moving the shift position from the P position to the R position and an operation of moving the shift position from the N position to the D position are the same as the above operation of moving the shift position from the R position to the N position.

Figure 10:
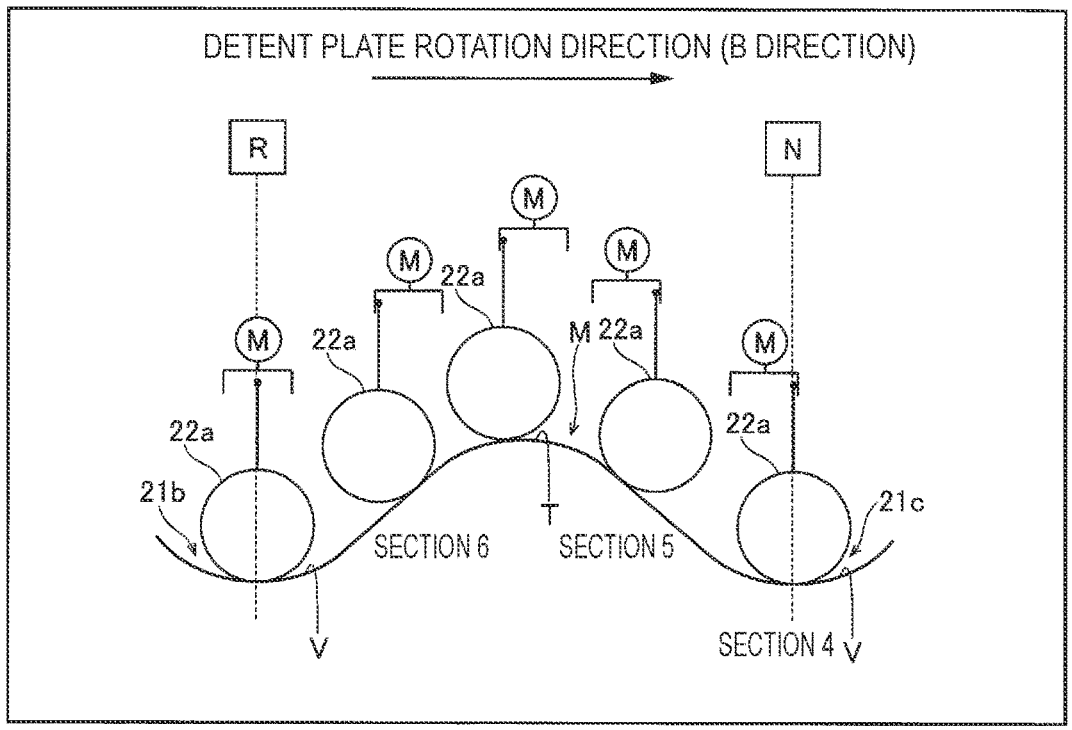
FIG. 10 is a schematic diagram showing a state in which the roller portion of the shift device according to the first embodiment is moved from the N position toward the R position.

As shown in FIGS. 8 and 10, by reversing a rotation direction of the motor 11, the shift position is moved to the R position via the N position (a section 4), a section 5, and a section 6.

An operation at the N position (the section 4) is the same as the above operation at the section 1. That is, while the rotation angle (the rad) of the motor 11 detected by the rotor rotation angle sensor 12 (see FIG. 1) linearly decreases, the rotation angle (the rad) of the output shaft 14b detected by the output shaft rotation angle sensor 13 (see FIG. 1) is constant.

An operation in the section 5 is the same as the above operation in the section 2. That is, in the section 5, the rotation angle of the motor 11 linearly decreases, and the rotation angle (the rad) of the output shaft 14b decreases at a constant rate.

An operation in the section 6 is the same as the above operation in the section 3. That is, while the rotation angle of the motor 11 decreases, the rotation angle (the rad) of the output shaft 14b rapidly decreases as the roller portion 22a drops (is suctioned) into the valley bottom V.

ECU

Figure 11:
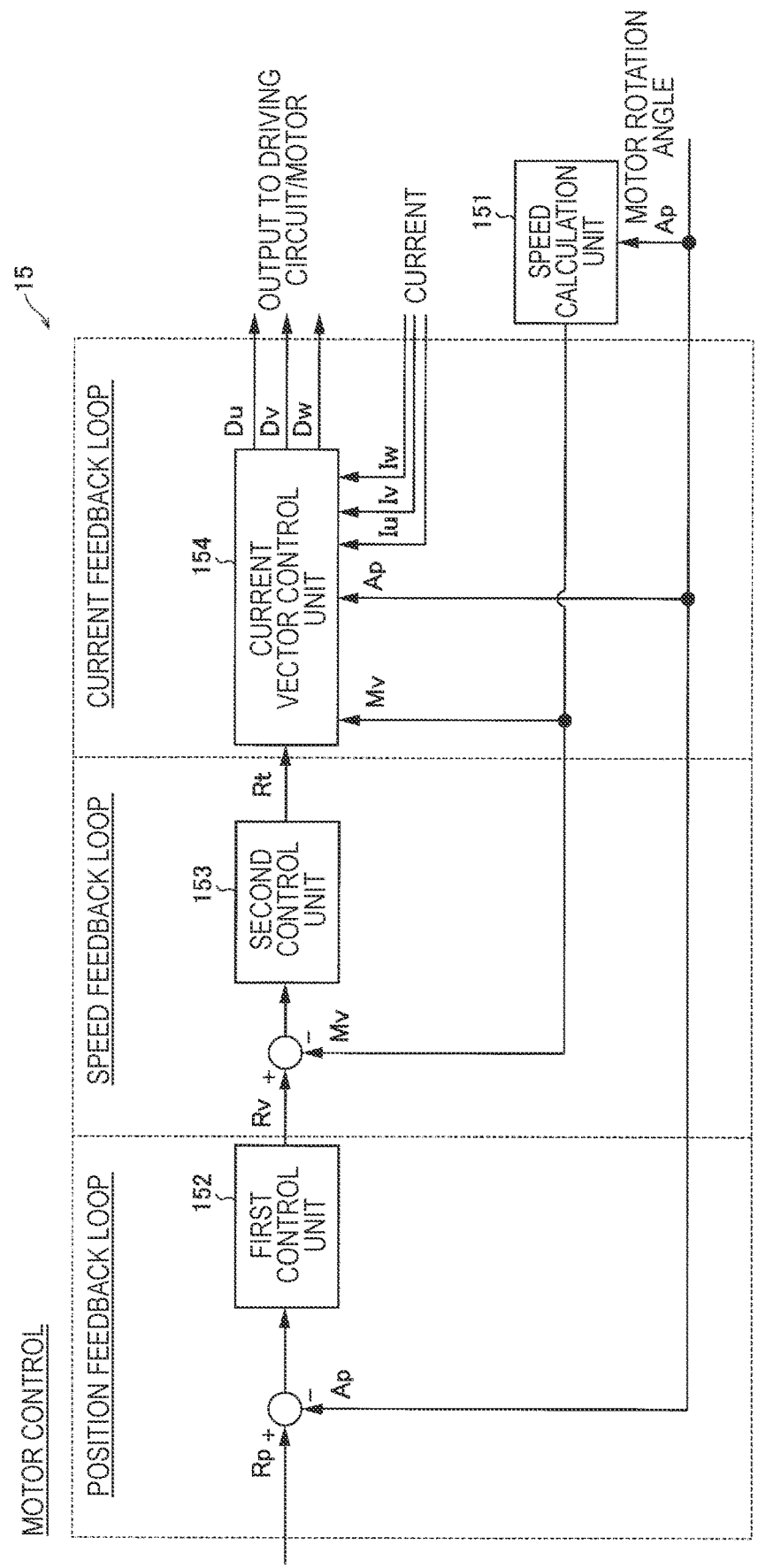
FIG. 11 is a block diagram showing motor control of the shift device according to the first embodiment.

As shown in FIG. 11, the ECU 15 includes, as functional blocks of a motor control program, a speed calculation unit 151, a first control unit 152, a second control unit 153, and a current vector control unit 154. The speed calculation unit 151 calculates an angular velocity Mv of the motor 11 based on a rotation angle Ap of the motor 11.

The first control unit 152 calculates a target angular velocity Rv of the motor 11 based on a target rotation angle Rp of the motor 11 and the rotation angle Ap of the motor 11. Specifically, the first control unit 152 is a proportional control unit (a P control unit). That is, the first control unit 152 calculates the target angular velocity Rv of the motor 11 according to a first proportional gain based on a difference between the target rotation angle Rp of the motor 11 and the rotation angle Ap of the motor 11.

The second control unit 153 calculates a target torque Rt of the motor 11 based on the target angular velocity Rv and the angular velocity Mv of the motor 11. Specifically, the second control unit 153 is a proportional control unit (a P control unit). That is, the second control unit 153 calculates the target torque Rt of the motor 11 according to a second proportional gain based on a difference between the target angular velocity Rv of the motor 11 and the angular velocity Mv of the motor 11.

The current vector control unit 154 controls driving of the motor 11 based on the target torque Rt calculated by the second control unit 153, the angular velocity Mv of the motor 11, the rotation angle Ap of the motor 11, and a current Iu, a current Iv, and a current Iw that flow through the motor 11.

Here, the current vector control unit 154 includes a three-phase to two-phase conversion unit (not shown) as a functional block of the motor control program. The three-phase to two-phase conversion unit converts, based on the current Iu, the current Iv, and the current Iw, and the rotation angle Ap, the current Iu, the current Iv, and the current Iw that respectively flow through a U-phase coil, a V-phase coil, and a W-phase coil into a two-phase current Iq (a q-axis current) and a two-phase current Id (a d-axis current).

In the shift device 100, for example, at the time of factory shipment, the rotation angle of the motor 11 (the rotor 111) corresponding to the valley bottom V is acquired (learned) for each shift device 100. Hereinafter, acquiring (learning) of the rotation angle of the motor 11 (the rotor 111) corresponding to the valley bottom V (a center of the backlash Ba) at each of the plurality of shift positions (the P position, the R position, the N position, and the D position) will be described. The rotation angle of the motor 11 corresponding to the valley bottom V is acquired by, for example, the ECU 15.

Estimation of Load Torque

As shown in FIGS. 12 to 15, the ECU 15 according to the first embodiment learns the shift position based on a change amount of a load torque applied to the motor 11 while the detent spring 22 is moved to continuously pass through the plurality of valley portions 21a, 21b, 21c, and 21d.

That is, the detent spring 22 (the roller portion 22a) is moved to continuously pass through the valley portion 21a, the valley portion 21b, the valley portion 21c, and the valley portion 21d. Further, the ECU 15 detects a width W of a backlash provided in the speed reducing mechanism 14a based on the load torque while the detent spring 22 is moved. The ECU 15 learns the shift position based on the detected width W of the backlash Ba.

Here, the load torque is substantially the same as a disturbance torque in control calculated by the ECU 15. The disturbance torque in control is a difference between a torque that is to be originally output by the rotor 111 and a torque that is actually output by the rotor 111. That is, a torque in control is acquired from a difference between an electrical torque acquired by adding a reluctance torque and a magnet torque and a mechanical torque acquired by multiplying an inertia moment of the rotor 111 and an angular acceleration of the rotor 111. The ECU 15 estimates the disturbance torque in control based on the difference between the electric torque and the mechanical torque.

Specifically, the torque in control is calculated according to $T_{err}=T_{elc}-T_{mch}$. $T_{err}$ is the torque in control. $T_{elc}$ is the electric torque. $T_{mch}$ is the mechanical torque.

The electric torque is calculated according to $T_{elc}=P\times\psi a\times Iq+P\times((Ld-Lq)\times Id\times Iq)$. Here, P is the number of pole pairs of the motor 11. $\psi a$ is an interlinkage magnetic flux. $\psi a$ is set according to a map based on a temperature change. The current Iq is the above-described q-axis current. Ld is a d-axis inductance. Ld is set in advance. Lq is a q-axis inductance. Lq is set in advance. Id is the above-described d-axis current.

The mechanical torque $T_{mch}$ is calculated according to $J\times(\omega[n]-\omega[n-1])/T_{cyc}$. J is the inertia moment of the rotor 111. J is set in advance. $\omega$ is the angular acceleration of the rotor 111. $\omega$ is calculated based on the rotation angle of the rotor 111 that is measured by the rotor rotation angle sensor 12. $T_{cyc}$ is a motor control cycle.

As described above, the ECU 15 learns the shift position based on the change amount of the disturbance torque in control corresponding to the load torque. That is, the ECU 15 detects the width W of the backlash Ba provided in the driving force transmission mechanism 14 based on the change amount of the disturbance torque in control, and learns the shift position based on the detected width W of the backlash Ba.

Specifically, in the ECU 15, on the basis that the change amount of the disturbance torque in control changes from a value less than the threshold value Th to a value equal to or greater than the threshold value Th when the detent spring 22 moves from each of the four valley portions 21a, 21b, 21c, and 21d toward the mountain portion M, the rotation angles of the rotor 111 corresponding to an end portion Ed1 and an end portion Ed2 of the width W of the backlash Ba are acquired, and the width W of the backlash Ba is acquired based on rotation angles θ1 to θ8 of the rotor 111 corresponding to the end portion Ed1 and the end portion Ed2 of the width W of the backlash Ba.

Figure 12:
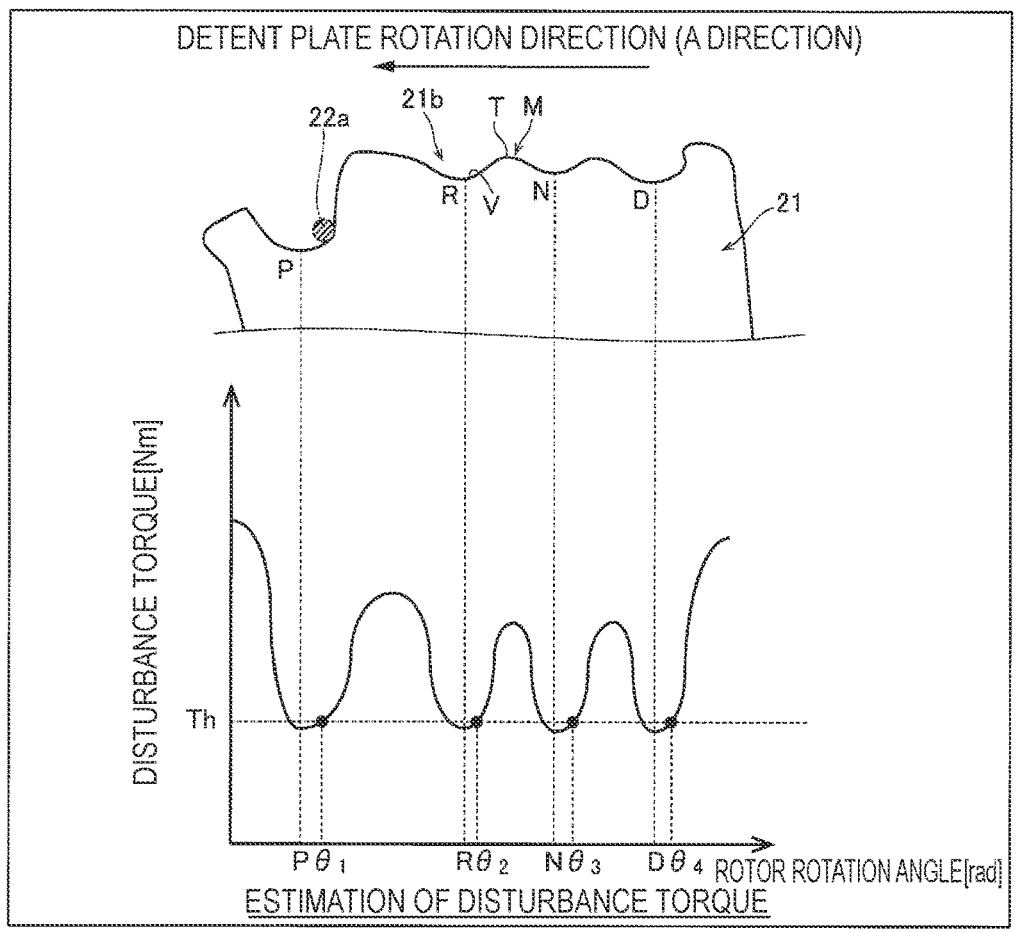
FIG. 12 is a graph showing disturbance torque in control when the detent plate of the shift device according to the first embodiment rotates in an A direction.
Figure 13:
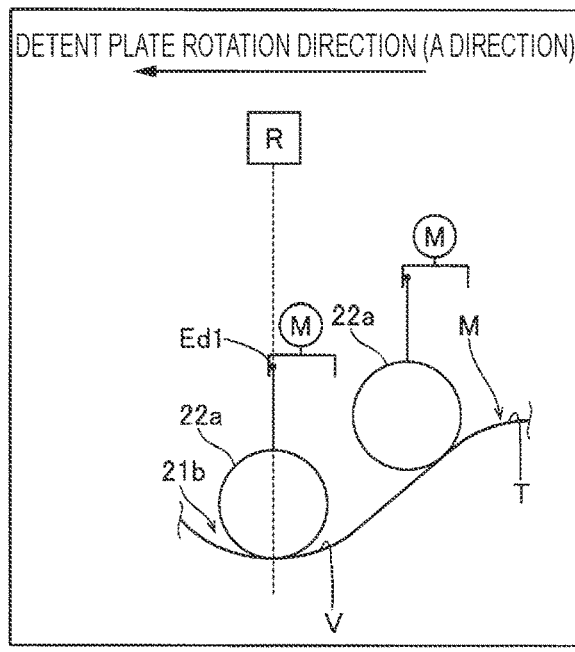
FIG. 13 is an explanatory diagram showing a state in which a detent spring moves from the R position toward the N position in the shift device according to the first embodiment.

Here, as an example shown in FIGS. 12 and 13, the detent spring 22 moves from the R position to the N position in a forward path in which the detent spring 22 moves in the order of the P position, the R position, the N position, and the D position.

The rotor 111 rotates by the width W of the backlash Ba, so that the engaging convex portion 143c abuts against the end portion Ed1 (the end portion on one side of the elongated hole 142b of the intermediate gear 142) of the width W of the backlash Ba. Therefore, the detent spring 22 moves from the valley portion 21b toward the mountain portion M. Specifically, when the rotor 111 rotates by the width W of the backlash Ba, no load torque is applied to the motor 11. When the engaging convex portion 143c abuts against the end portion Ed1 of the width W of the backlash Ba, a load torque is applied to the motor 11. Accordingly, in the ECU 15, since the change amount of the load torque (the disturbance torque in control) changes from a value less than the threshold value Th to a value equal to or greater than the threshold value Th, the rotation angle θ2 of the rotor 111 corresponding to the end portion Ed1 of the width W of the backlash Ba in the valley portion 21b is acquired.

Figure 14:
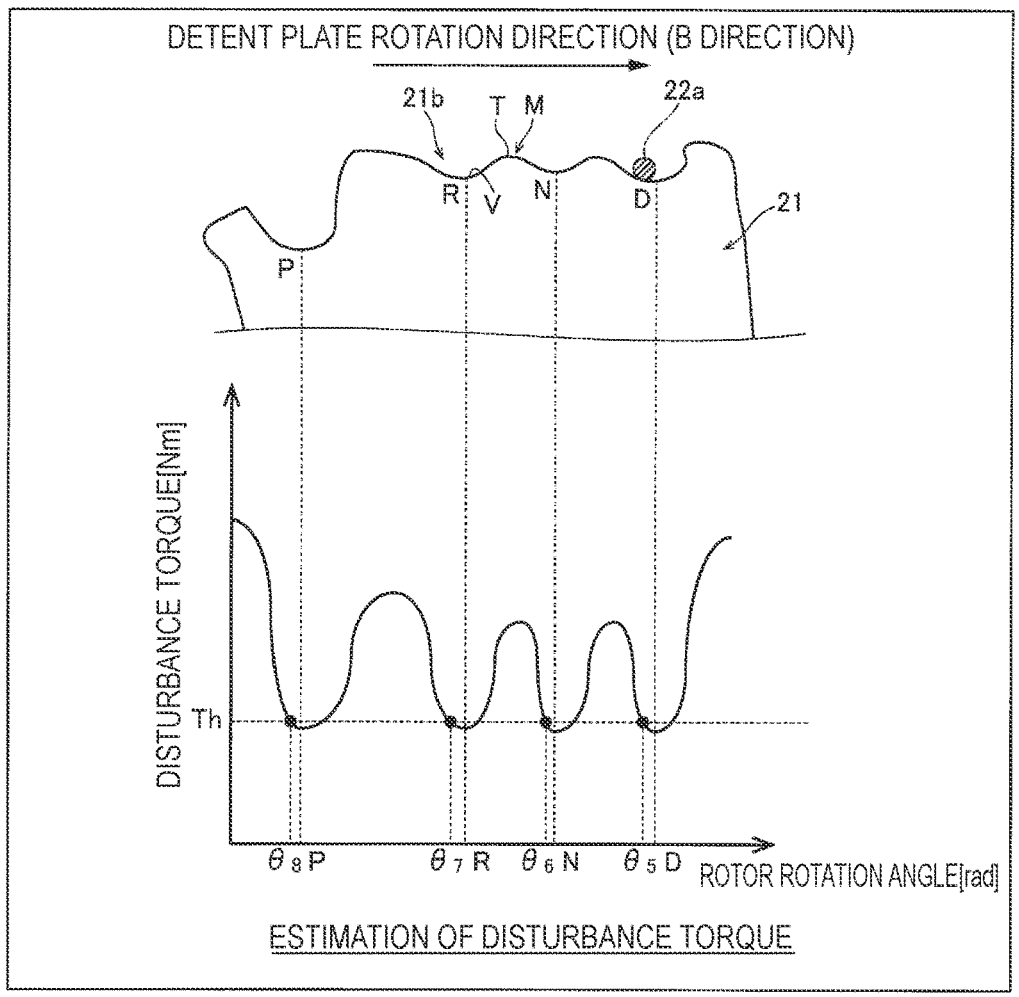
FIG. 14 is a graph showing the disturbance torque in control when the detent plate of the shift device according to the first embodiment rotates in a B direction.
Figure 15:
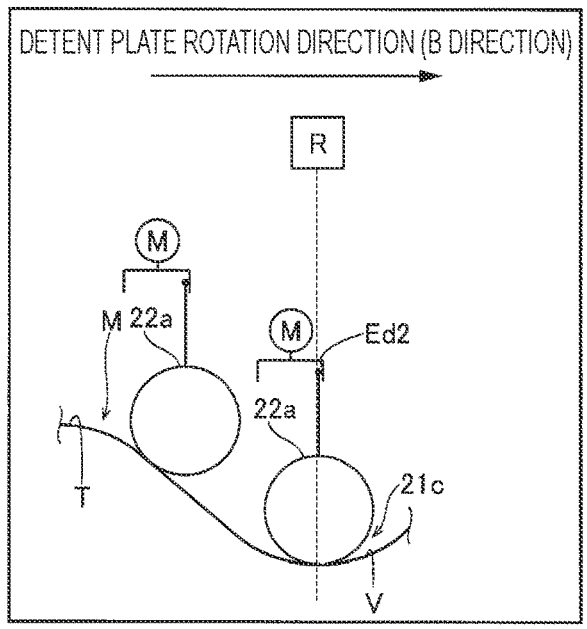
FIG. 15 is an explanatory diagram showing a state in which the detent spring moves from the R position toward a P position in the shift device according to the first embodiment.

As an example shown in FIGS. 14 and 15, the detent spring 22 moves from the R position to the P position in a return path in which the detent spring 22 moves in an order of the D position, the N position, the R position, and the P position.

The rotor 111 rotates by the width W of the backlash Ba, so that the engaging convex portion 143c abuts against the end portion Ed2 (the end portion on the other side of the elongated hole 142b of the intermediate gear 142) of the width W of the backlash Ba. Therefore, the detent spring 22 moves from the valley portion 21b toward the mountain portion M. Specifically, when the rotor 111 rotates by the width W of the backlash Ba, no load torque is applied to the motor 11. When the engaging convex portion 143c abuts against the end portion Ed2 of the width W of the backlash Ba, a load torque is applied to the motor 11. Accordingly, in the ECU 15, since the change amount of the load torque (the disturbance torque in control) changes from a value less than the threshold value Th to a value equal to or greater than the threshold value Th, the rotation angle θ7 of the rotor 111 corresponding to the end portion Ed2 of the width W of the backlash Ba in the valley portion 21b is acquired.

As a result, in the ECU 15, the width W of the backlash Ba at the R position is acquired based on the rotation angle θ2 of the rotor 111 corresponding to the end portion Ed1 of the width W of the backlash Ba and the rotation angle θ7 corresponding to the end portion Ed2. Then, in the ECU 15, a rotation angle at the R position serving as the shift position is acquired based on a center position of the acquired width W of the backlash Ba. That is, a rotation angle corresponding to the center position of the acquired width W of the backlash Ba is acquired as the R position. In the ECU 15, the width W of the backlash Ba is acquired not only at the R position but also at the P position, the N position, and the D position according to the same method.

The ECU 15 changes the threshold value Th based on the temperature detected by the temperature detection unit 16. Specifically, as the temperature detected by the temperature detection unit 16 increases, a resistance of the exciting coil of the stator 112 decreases and a viscous resistance of a grease applied to the motor 11 decreases, and thus the threshold value Th is changed to decrease. As the temperature detected by the temperature detection unit 16 decreases, the resistance of the exciting coil of the stator 112 increases and the viscous resistance of the grease applied to the motor 11 increases, and thus the threshold value Th is changed to increase.

The ECU 15 includes a filter as a functional block of a program different from the motor control program. The filter is a filter that removes noise of the current detected by the current sensor 15a. Specifically, the filter is a filter that removes a high-frequency component of the disturbance torque in control. As described above, the ECU 15 removes the high-frequency component of the disturbance torque in control that is estimated based on the difference between the electric torque and the mechanical torque.

Shift Position Learning Process

Figure 16:
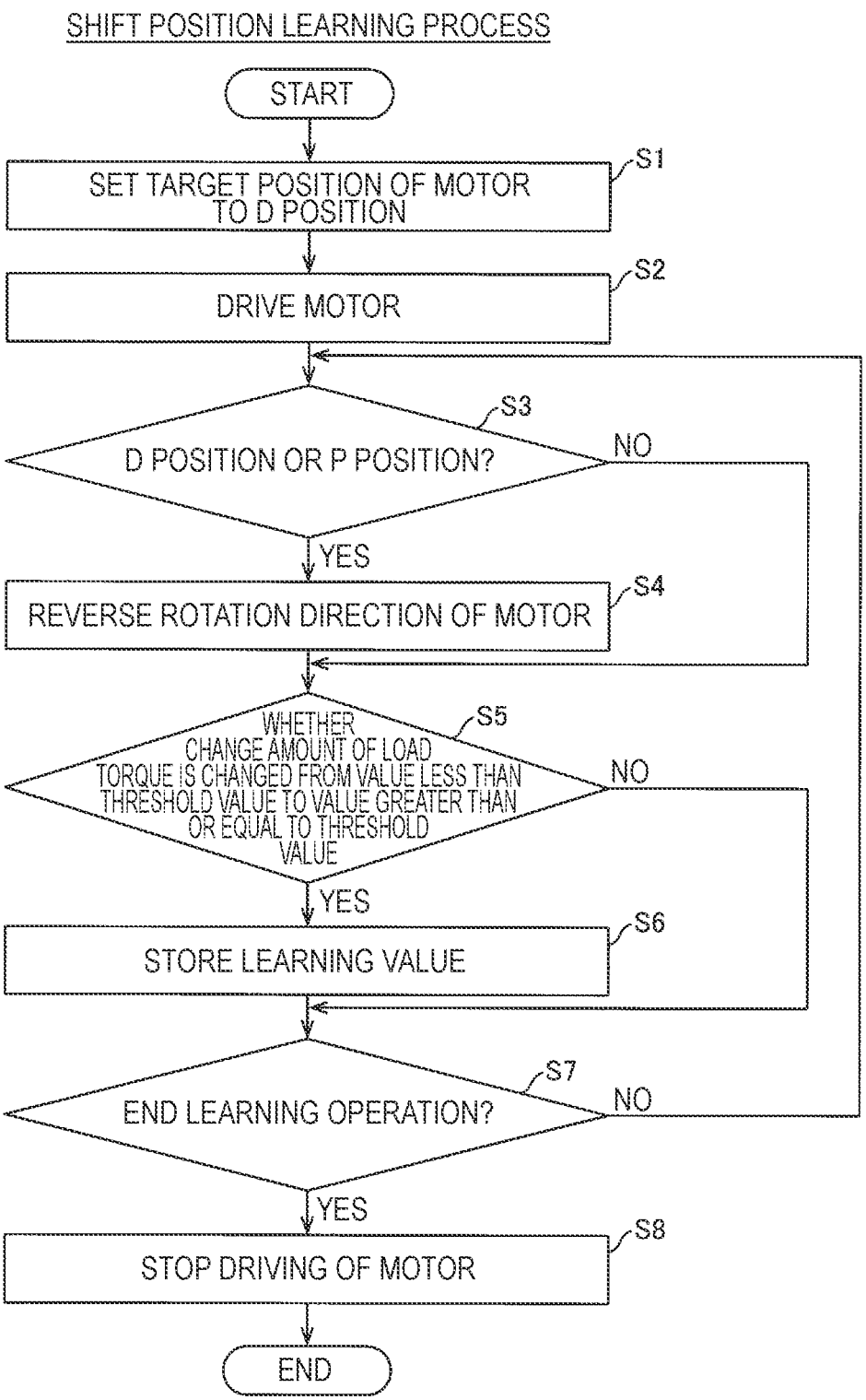
FIG. 16 is a flowchart showing a shift position learning process in the shift device according to the first embodiment.

Hereinafter, a shift position learning process executed by the ECU 15 will be described with reference to FIG. 16. The shift position learning process is a process of learning the shift position based on the disturbance torque in control (the load torque) acquired according to the difference between the electric torque and the mechanical torque.

In step S1, the ECU 15 sets a target position of the motor 11 to the D position in order to rotate the detent plate 21 assembled to the N position and set the detent plate 21 to the D position. At this time, the ECU 15 sets, based on the D position set in advance, the target position of the motor 11 to the D position. In step S2, the ECU 15 drives the motor 11 in order to switch the shift position to the D position.

In step S3, the ECU 15 determines whether the shift position is the D position or the P position. When the shift position is the D position or the P position, the process proceeds to step S4, and when the shift position is not the D position or the P position, the process proceeds to step S5.

In step S4, the ECU 15 reverses the rotation direction of the motor 11. In step S5, the ECU 15 determines whether the change amount of the load torque (the disturbance torque in control) is changed from a value less than the threshold value Th to a value greater than or equal to the threshold value Th. When the change amount of the load torque is changed from a value less than the threshold value Th to a value greater than or equal to the threshold value Th, the process proceeds to step S6, and when the change amount of the load torque is not changed from a value less than the threshold value Th to a value greater than or equal to the threshold value Th, the process proceeds to step S7.

In step S6, the ECU 15 stores a learning value in the storage unit 17. That is, ECU 15 stores, as the learning value, the end portion Ed1 or the end portion Ed2 of the width W of the backlash Ba at each of the P position, the R position, the N position, and the D position in the storage unit 17. In step S7, the ECU 15 determines whether to end the learning operation. That is, the ECU 15 determines whether all of the end portion Ed1 or the end portion Ed2 of the width W of the backlash Ba at each of the P position, the R position, the N position, and the D position is stored in the storage unit 17 as the learning value. When the learning operation is to be ended, the process proceeds to step S8, the driving of the motor 11 is stopped, and then the shift position learning process is ended. If the learning operation is not to be ended, the process returns to step S3.

Effects According to First Embodiment

In the first embodiment, the following effects can be attained.

In the first embodiment, as described above, the shift device 100 estimates the disturbance torque in control based on the difference between the electrical torque acquired by adding the reluctance torque and the magnet torque and the mechanical torque acquired by multiplying the inertia moment of the rotor 111 and the angular acceleration of the rotor 111. Here, when the load torque is estimated based on a change in the current, only a torque output from the motor 11 can be detected, and thus accuracy of the estimation of the load torque is reduced. However, by estimating the disturbance torque in control serving as the load torque based on the difference between the electric torque and the mechanical torque, unlike the case in which the load torque is estimated based on the change in the current, the load torque can be estimated in a state in which a torque required to move the motor 11 is removed from the torque output by the motor 11, and thus the load torque can be estimated with high accuracy.

In the first embodiment, as described above, the shift device 100 learns the shift position based on the change amount of the load torque applied to the motor 11 while the detent spring 22 is moved to continuously pass through the four valley portions 21a, 21b, 21c, and 21d. Here, the load torque is acquired based on the reluctance torque including the current Iq and the current Id, the magnet torque not including the current Iq and the current Id but including another current, the inertia moment of the rotor 111 not including the current Iq and the current Id, and the angular acceleration of the rotor 111 not including the current Iq and the current Id. Accordingly, a ratio of the current Iq and the current Id that contribute to the load torque can be reduced. Accordingly, by reducing the ratio of the contribution of the current Iq and the current Id to the load torque, the ratio of the noise of the current Iq and the current Id to the load torque can be reduced. As a result, it is possible to reduce an influence of the noise of the current Iq and the current Id in the load torque, and thus it is possible to learn (acquire) the shift position with high accuracy as compared with a case in which the shift position is learned using the change amount of the current value as it is.

In the first embodiment, as described above, the shift device 100 learns the shift position based on the change amount of the disturbance torque in control corresponding to the load torque. Accordingly, using the disturbance torque in control to learn the shift position, it is not necessary to provide a sensor that acquires the load torque separately from the disturbance torque, and thus the configuration of the shift device 100 can be simplified.

In the first embodiment, as described above, the shift device 100 includes the driving force transmission mechanism 14 that transmits the driving force of the motor 11 to the detent plate 21. The shift device 100 detects the width W of the backlash Ba provided in the driving force transmission mechanism 14 based on the change amount of the disturbance torque in control, and learns the shift position based on the detected width W of the backlash Ba. Here, when control for learning a position where a small current value (a valley portion of the current value) is detected as the shift position is executed, a position where the smallest current value is detected may not be uniquely determined due to the backlash Ba provided in the driving force transmission mechanism 14. However, as described above, since the shift position can be uniquely learned by learning the shift position using the width W of the backlash Ba, the shift position can be reliably acquired.

In the first embodiment, the shift device 100 includes the rotor rotation angle sensor 12 that detects the rotation angle of the rotor 111. In the shift device 100, on the basis that the change amount of the disturbance torque in control changes from a value less than the threshold value Th to a value equal to or greater than the threshold value Th when the detent spring 22 moves from each of the four valley portions 21a, 21b, 21c, and 21d toward the mountain portion M, the rotation angles of the rotor 111 corresponding to the end portion Ed1 and the end portion Ed2 of the width W of the backlash Ba are acquired, and the width W of the backlash Ba is acquired based on the rotation angles of the rotor 111 corresponding to the end portion Ed1 and the end portion Ed2 of the width W of the backlash Ba. Accordingly, since the end portion Ed1 and the end portion Ed2 of the backlash Ba can be acquired using the threshold value Th, it is possible to easily acquire the rotation angles of the rotor 111 corresponding to the end portion Ed1 and the end portion Ed2 of the width W of the backlash Ba. As a result, since the width W of the backlash Ba can be acquired based on the rotation angles of the rotor 111 corresponding to the end portion Ed1 and the end portion Ed2 of the width W of the backlash Ba, it is possible to easily acquire the width W of the backlash Ba.

In the first embodiment, as described above, the shift device 100 estimates the disturbance torque in control based on the difference between the electrical torque acquired by adding the reluctance torque and the magnet torque and the mechanical torque acquired by multiplying the inertia moment of the rotor 111 and the angular acceleration of the rotor 111. Accordingly, by estimating the disturbance torque in control based on the difference between the electrical torque and the mechanical torque, unlike the case in which the control is executed for learning, as the shift position, the portion where the small current value (the valley portion of the current value) is detected, it is possible to individually learn all the shift positions without offsetting the learned shift position by a predetermined value and learning the other shift positions, and thus it is possible to accurately learn the shift position.

Second Embodiment

Next, a shift device 200 according to a second embodiment will be described with reference to FIG. 17. Specifically, unlike the shift device 100 according to the first embodiment that estimates the load torque based on the difference between the electric torque and the mechanical torque, the shift device 200 according to the second embodiment estimates the load torque based on the target torque Rt output from the second control unit 153 in motor control. In the second embodiment, the same components as those according to the above first embodiment are denoted by the same reference numerals, and description thereof will be omitted.

Figure 17:
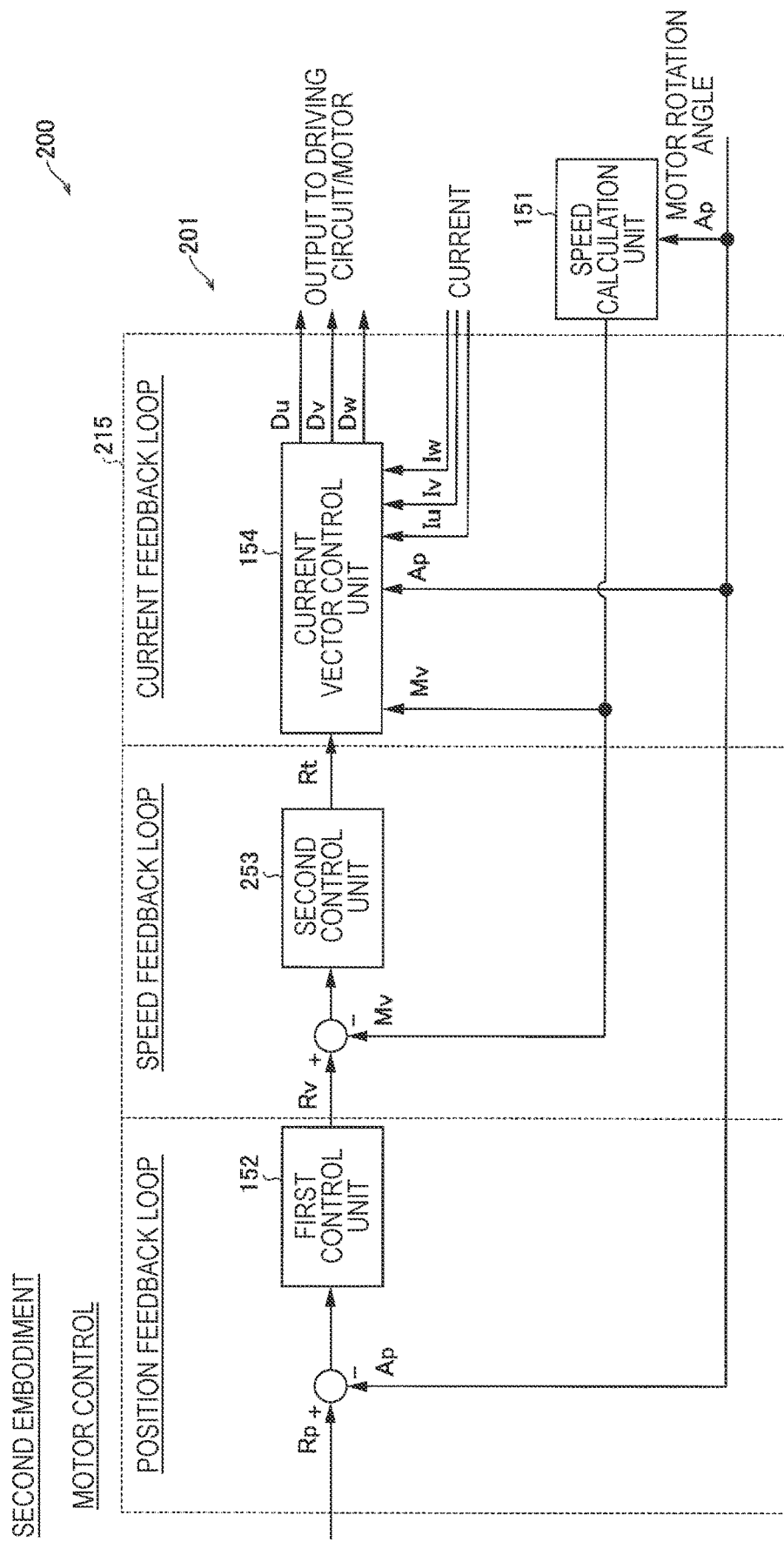
FIG. 17 is a block diagram showing motor control of a shift device according to a second embodiment.

As shown in FIGS. 1, 2, and 17, the shift device 200 includes an actuator unit 201 and a shift switching mechanism 2 driven by the actuator unit 201. The actuator unit 201 according to the second embodiment includes the motor 11, the rotor rotation angle sensor 12, the output shaft rotation angle sensor 13, the driving force transmission mechanism 14 (an example of the "transmission mechanism" in the claims), an ECU 215, the temperature detection unit 16, and the storage unit 17.

ECU

As shown in FIG. 11, the ECU 215 includes, as functional blocks of the motor control program, the speed calculation unit 151, the first control unit 152, a second control unit 253, and the current vector control unit 154. The speed calculation unit 151 calculates the angular velocity Mv of the motor 11 based on the rotation angle Ap of the motor 11.

The second control unit 253 calculates the target torque Rt of the motor 11 based on the target angular velocity Rv and the angular velocity Mv of the motor 11. Specifically, the second control unit 253 is a proportional control unit (P control unit). That is, the second control unit 253 calculates the target torque Rt of the motor 11 according to the second proportional gain based on the difference between the target angular velocity Rv of the motor 11 and the angular velocity My of the motor 11.

Here, in the shift device 200, for example, at the time of factory shipment, the rotation angle of the motor 11 (rotor 111) corresponding to the valley bottom V is acquired (learned) for each shift device 200. Hereinafter, acquiring (learning) of the rotation angle of the motor 11 (the rotor 111) corresponding to the valley bottom V (a center Cp of the backlash Ba) at each of the plurality of shift positions (the P position, the R position, the N position, and the D position) will be described. The rotation angle of the motor 11 corresponding to the valley bottom V is acquired by, for example, the ECU 215.

Estimation of Load Torque

As shown in FIGS. 18 to 21, the ECU 215 according to the second embodiment learns the shift position based on the change amount of the load torque applied to the motor 11 while the detent spring 22 is moved to continuously pass through the four valley portions 21a, 21b, 21c, and 21d. The ECU 215 learns the shift position based on the change amount of the disturbance torque in control corresponding to the load torque.

Specifically, the ECU 215 estimates the disturbance torque in control serving as the load torque based on multiplication of a proportional gain and a steady-state deviation that is a difference between a target speed of the motor 11 and a current speed of the motor 11 in the steady rotation state of the rotor 111.

Here, the second control unit 253 executes proportional control and does not have an integral gain. Therefore, in the second control unit 253, a steady-state deviation caused by an external load is generated in the steady rotation state, and thus the external load is proportional to the target torque Rt in the steady rotation state. That is, in the steady rotation state, since the external load is generated due to the load torque applied to the motor 11, the disturbance torque in control corresponding to the load torque is proportional to the target torque Rt. As a result, in the ECU 215, a change tendency (a trend) of the target torque Rt and a change tendency (a trend) of the load torque substantially coincide with each other in the steady rotation state, and thus the disturbance torque in control serving as the load torque can be estimated based on the target torque Rt.

In the steady rotation state of the rotor 111, the ECU 215 detects the width W of the backlash Ba provided in the driving force transmission mechanism 14 based on the change amount of the disturbance torque in control, and learns the shift position based on the detected width W of the backlash Ba.

Specifically, in the ECU 215, on the basis that the change amount of the disturbance torque in control changes from a value less than the threshold value Th to a value equal to or greater than the threshold value Th in the steady rotation state of the rotor 111 when the detent spring 22 moves from each of the four valley portions 21a, 21b, 21c, and 21d toward the mountain portion M, control for acquiring rotation angles θ1 to θ4 of the rotor 111 corresponding to the end portion Ed1 and the end portion Ed2 of the width W of the backlash Ba is executed. The ECU 215 acquires the width W of the backlash Ba based on the rotation angles θ1 to θ4 of the rotor 111 corresponding to the end portion Ed1 and the end portion Ed2 of the width W of the backlash Ba.

Figure 18:
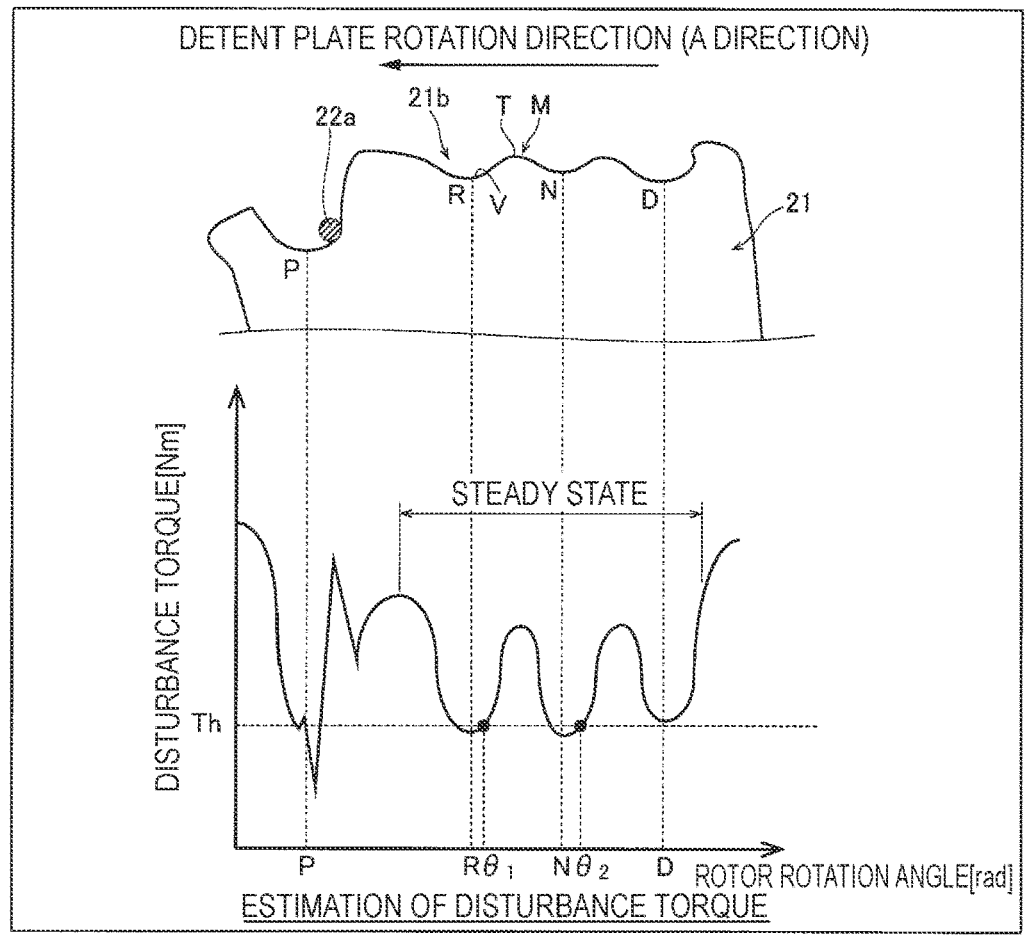
FIG. 18 is a graph showing disturbance torque in control when the detent plate of the shift device according to the second embodiment rotates in the A direction.
Figure 19:
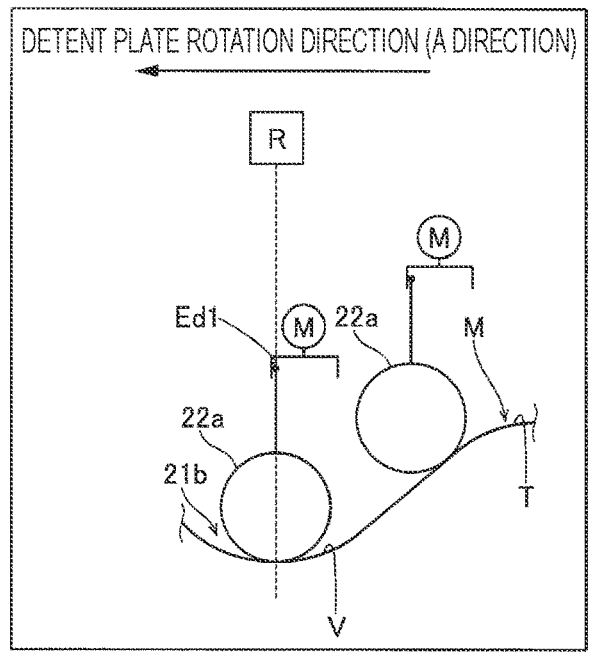
FIG. 19 is an explanatory diagram showing a state in which the detent spring moves from the R position toward the N position in the shift device according to the second embodiment.

As an example shown in FIGS. 18 and 19, the detent spring 22 moves from the R position to the N position in the forward path in which the detent spring 22 moves in the order of the P position, the R position, the N position, and the D position. In the forward path in which the detent spring 22 moves in the order of the P position, the R position, the N position, and the D position, the steady rotation state refers to a section of the rotor rotation angles after an apex of the mountain portion M between the P position and the R position in the forward path.

The rotor 111 rotates by the width W of the backlash Ba, so that the engaging convex portion 143c abuts against the end portion Ed1 (the end portion on one side of the elongated hole 142b of the intermediate gear 142) of the width W of the backlash Ba, and thus the detent spring 22 moves from the valley portion 21b toward the mountain portion M. Specifically, when the rotor 111 rotates by the width W of the backlash Ba, no load torque is applied to the motor 11. When the engaging convex portion 143c abuts against the end portion Ed1 of the width W of the backlash Ba, a load torque is applied to the motor 11. Here, since a state of a movement from the R position to the N position is the steady rotation state, when the engaging convex portion 143c abuts against the end portion Ed1 of the width W of the backlash Ba, the load torque applied to the motor 11 is acquired as the target torque Rt. In the ECU 215, since the change amount of the load torque (the disturbance torque in control) changes from a value less than the threshold value Th to a value equal to or greater than the threshold value Th, the rotation angle θ1 of the rotor 111 corresponding to the end portion Ed1 of the width W of the backlash Ba in the valley portion 21b is acquired.

Figure 20:
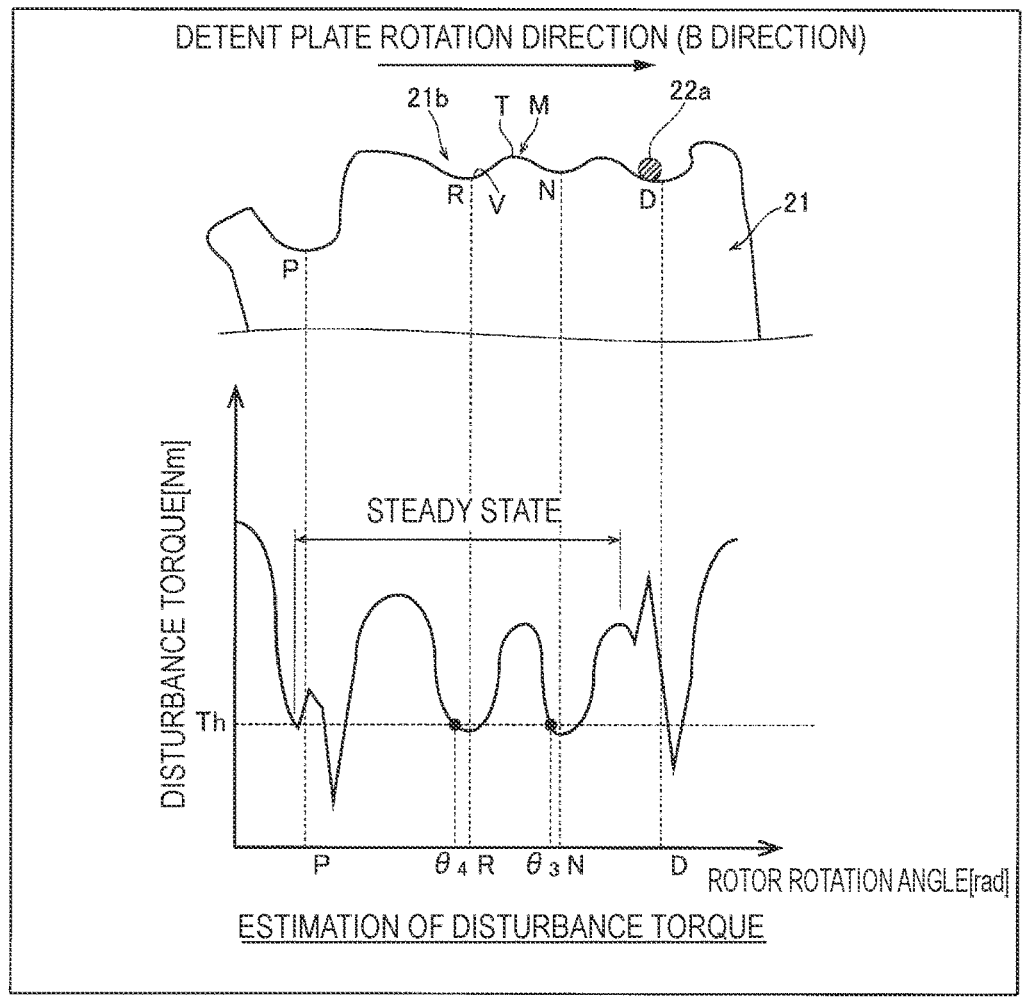
FIG. 20 is a graph showing the disturbance torque in control when the detent plate of the shift device according to the second embodiment rotates in the B direction.
Figure 21:
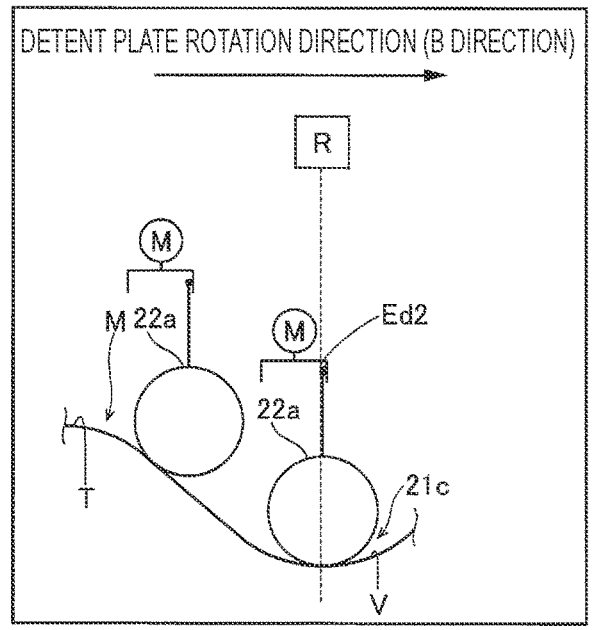
FIG. 21 is an explanatory diagram showing a state in which the detent spring moves from the R position toward the P position in the shift device according to the second embodiment.

As an example shown in FIGS. 20 and 21, the detent spring 22 moves from the R position to the P position in the return path in which the detent spring 22 moves in the order of the D position, the N position, the R position, and the P position. In the return path in which the detent spring 22 moves in the order of the D position, the N position, the R position, and the P position, the steady rotation state refers to a section of the rotor rotation angles after the apex of the mountain portion M between the D position and the N position in the return path.

When the rotor 111 rotates by the width W of the backlash Ba, the engaging convex portion 143c abuts against the end portion Ed2 (the end portion on the other side of the elongated hole 142b of the intermediate gear 142) of the width W of the backlash Ba, and thus the detent spring 22 moves from the valley portion 21b toward the mountain portion M. Specifically, when the rotor 111 rotates by the width W of the backlash Ba, no load torque is applied to the motor 11. When the engaging convex portion 143c abuts against the end portion Ed1 of the width W of the backlash Ba, a load torque is applied to the motor 11. Here, since a state of a movement from the R position to the P position is the steady rotation state, when the engaging convex portion 143c abuts against the end portion Ed2 of the width W of the backlash Ba, the load torque applied to the motor 11 is acquired as the target torque Rt. In the ECU 215, since the change amount of the load torque (the disturbance torque in control) changes from a value less than the threshold value Th to a value equal to or greater than the threshold value Th, the rotation angle θ4 of the rotor 111 corresponding to the end portion Ed2 of the width W of the backlash Ba in the valley portion 21b is acquired.

As a result, in the ECU 215, the width W of the backlash Ba at the R position is acquired based on the rotation angle θ1 of the rotor 111 corresponding to the end portion Ed1 of the width W of the backlash Ba and the rotation angle θ4 corresponding to the end portion Ed2. Then, in the ECU 215, a rotation angle at the R position serving as the shift position is acquired based on the center position of the acquired width W of the backlash Ba. In the ECU 215, not only the rotation angle at the R position but also a rotation angle at the N position is acquired according to the same method.

At the P position and the D position, since the target torque Rt is not stable due to an acceleration or a deceleration of the motor 11, a rotation angle at the P position and a rotation angle at the D position are not acquired based on the target torque Rt. Therefore, the rotation angle at the P position is acquired (learned) by offsetting the acquired rotation angle at the R position by a first predetermined value. The first predetermined value is a set value that is set in advance at the time of manufacturing. The rotation angle at the D position is acquired (learned) by offsetting the acquired rotation angle at the N position by a second predetermined value. The second predetermined value is a set value that is set in advance at the time of manufacturing. The other configurations according to the second embodiment are the same as those according to the first embodiment.

Effects According to Second Embodiment

In the second embodiment, the following effects can be attained.

In the second embodiment, as described above, the shift device 200 learns the shift position based on the change amount of the load torque applied to the motor 11 while the detent spring 22 is moved to continuously pass through the four valley portions 21a, 21b, 21c, and 21d. Accordingly, the shift position can be learned (acquired) with high accuracy.

In the second embodiment, as described above, the shift device 200 estimates the disturbance torque in control based on multiplication of the second proportional gain and the steady-state deviation that is the difference between the target angular velocity Rv of the motor 11 and the current angular velocity Mv of the motor 11 in the steady rotation state of the rotor 111. Accordingly, by estimating the disturbance torque in control based on the target angular velocity Rv of the motor 11 and the current angular velocity Mv of the motor 11, the disturbance torque in control can be estimated without using the current value, and thus the influence of the noise of the current can be eliminated. As a result, the shift position can be learned with higher accuracy. Since the target torque Rt acquired by the multiplication of the steady-state deviation in the steady rotation state of the rotor 111 and the second proportional gain can be used as it is as the disturbance torque in control, it is possible to prevent an increase in a processing load in control of the shift device 200. The other effects according to the second embodiment are the same as those according to the first embodiment.

Third Embodiment

Next, a shift device 300 according to a third embodiment will be described with reference to FIGS. 22 and 23. Specifically, unlike the shift device 100 according to the first embodiment in which the speed change mechanism 3 can be switched to any one of the shift positions of the P position, the R position, the N position, and the D position, in the shift device 300 according to the third embodiment, the speed change mechanism 3 can be switched to either the P position or a non-P position. In the third embodiment, the same components as those according to the first embodiment are denoted by the same reference numerals, and description thereof will be omitted.

Figure 22:
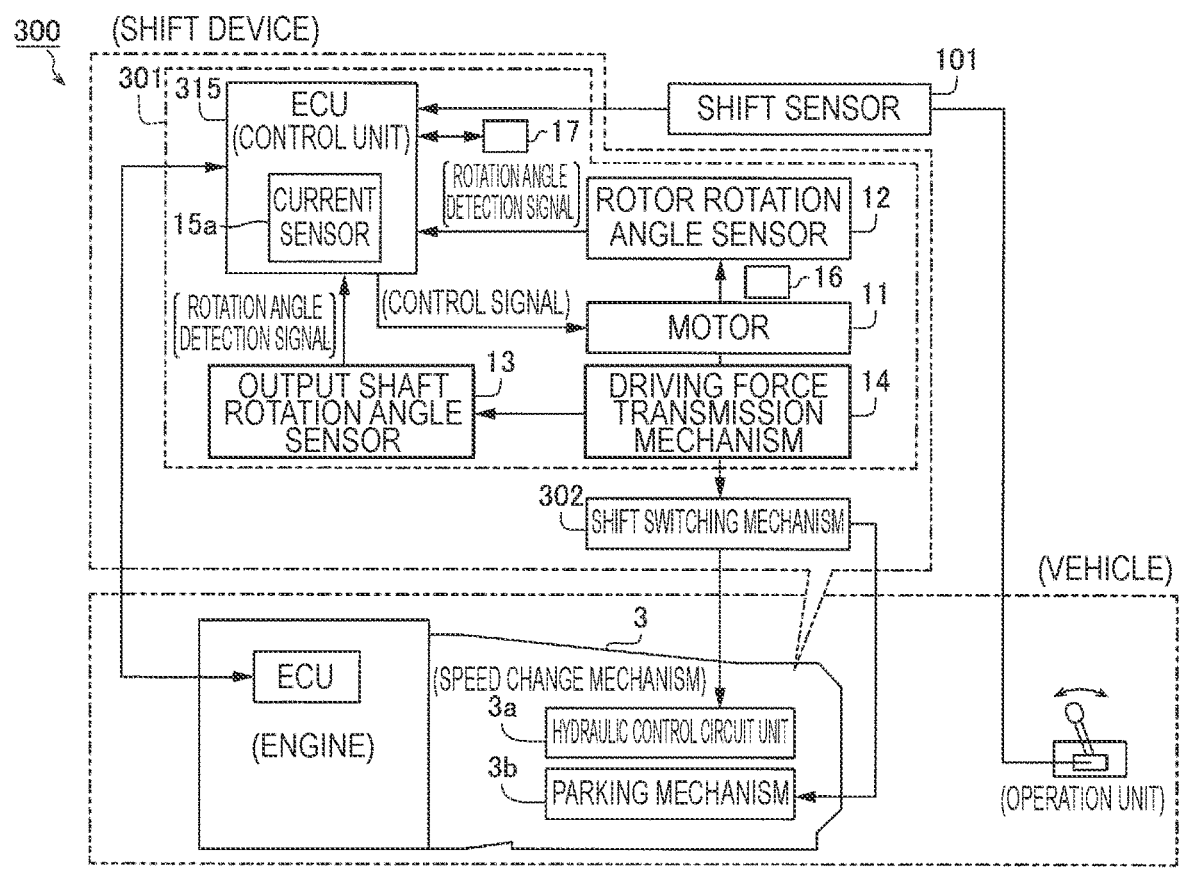
FIG. 22 is a block diagram showing a control configuration of a shift device according to a third embodiment.
Figure 23:
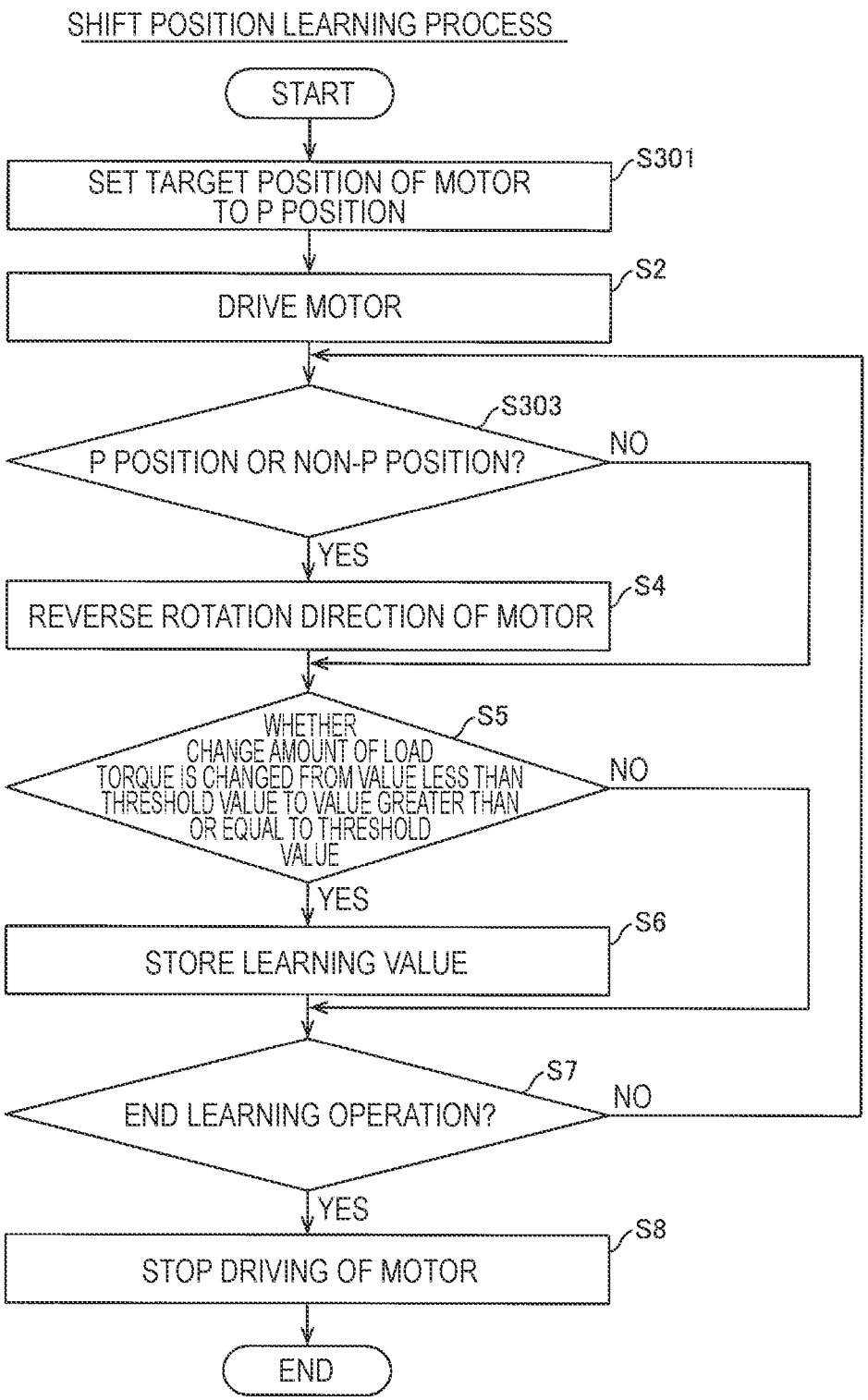
FIG. 23 is a flowchart showing a shift position learning process in the shift device according to the third embodiment.

As shown in FIG. 22, the shift device 300 includes an actuator unit 301 and a shift switching mechanism 302 driven by the actuator unit 301. The actuator unit 301 according to the third embodiment includes the motor 11, the rotor rotation angle sensor 12, the output shaft rotation angle sensor 13, the driving force transmission mechanism 14 (an example of the "transmission mechanism" in the claims), an electronic control unit (ECU) 315, the temperature detection unit 16, and the storage unit 17.

The shift switching mechanism 302 includes a detent plate 21 (not shown, an example of the "shift switching member" in the claims) and the detent spring 22 (not shown, an example of the "positioning member" in the claims). The detent spring 22 holds the detent plate at a rotation angle position corresponding to each of the P position and the non-P position.

The detent plate 21 includes two valley portions corresponding to the shift positions (the P position and the non-P position). The detent spring 22 establishes the shift position in a state in which the detent spring 22 is fitted into one of the two valley portions.

Shift Position Learning Process

Hereinafter, a shift position learning process executed by the ECU 315 will be described with reference to FIG. 23. The shift position learning process is a process of learning the shift position based on the disturbance torque in control (the load torque) acquired according to the difference between the electric torque and the mechanical torque.

In step S301, the ECU 315 sets the target position of the motor 11 to the P position in order to rotate the detent plate 21 assembled to the non-P position and set the detent plate to the P position. At this time, the ECU 315 sets, based on the P position set in advance, the target position of the motor 11 to the P position. In step S2, the ECU 315 drives the motor 11 in order to switch the shift position to the P position.

In step S303, the ECU 315 determines whether the shift position is the P position or the non-P position. When the shift position is the P position or the non-P position, the process proceeds to step S4, and when the shift position is not the P position or the non-P position, the process proceeds to step S5. Steps S4 to S8 are the same as steps S4 to S8 according to the first embodiment, and thus descriptions thereof will be omitted.

Effects According to Third Embodiment

In the third embodiment, the following effects can be attained.

In the third embodiment, as described above, the shift device 300 learns the shift position based on the change amount of the load torque applied to the motor 11 while the detent spring 22 is moved to continuously pass through the two valley portions. Accordingly, the shift position can be learned (acquired) with high accuracy. The other effects according to the third embodiment are the same as those according to the first embodiment.

Modification

It should be considered that the above-described embodiments disclosed here are examples in all respects and are not restrictive. The scope of this disclosure is shown according to the claims rather than the description of the above-described embodiments and further includes all changes (modifications) within the scope and meaning equivalent to the claims.

For example, in the above first embodiment, an example has been shown in which the ECU 15 sets the target position of the motor 11 to the D position in order to rotate the detent plate 21 (the shift switching member) assembled to the N position and set the detent plate 21 to the D position, and this disclosure is not limited thereto. In this disclosure, the ECU may set the target position of the motor to the P position in order to rotate the shift switching member assembled to the N position and set the shift switching member to the P position.

In the above first to third embodiments, an example has been shown in which the width W of the backlash Ba is the width W of the backlash Ba of the speed reducing mechanism 14a, and this disclosure is not limited thereto. In this disclosure, the width of the backlash may be a width of a backlash other than the speed reducing mechanism in the driving force transmission mechanism.

In the above first to third embodiments, an example has been shown in which the shift device 100 (200, 300) disclosed here is applied to a shift device for a vehicle, and this disclosure is not limited to this. In this disclosure, the shift device may be applied to a shift device other than the shift device for a vehicle, for example, a shift device for a train.

Figure 24:
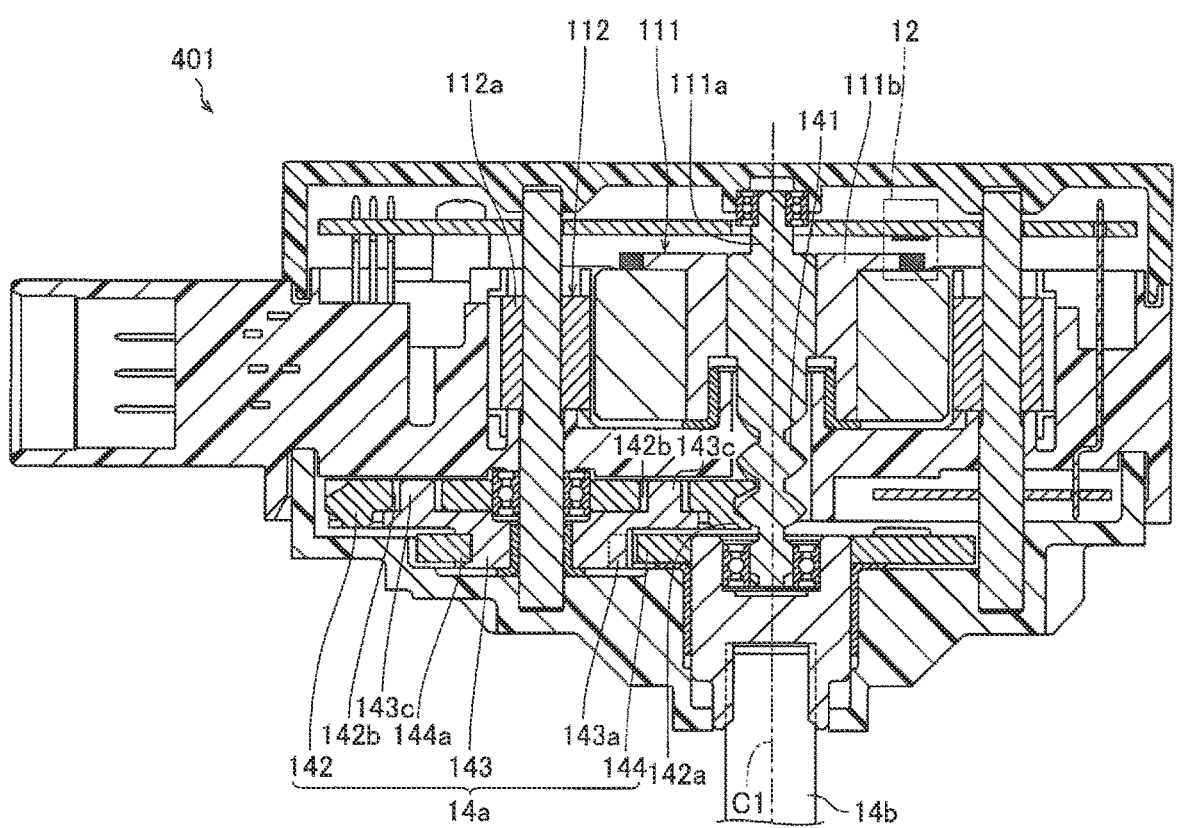
FIG. 24 is a cross-sectional view showing an actuator unit constituting a shift device according to a modification of the first to third embodiments.

In the above first to third embodiments, an example has been shown in which the actuator unit 1 (201, 301) includes the output shaft rotation angle sensor 13, and this disclosure is not limited thereto. In this disclosure, as in a modification shown in FIG. 24, an actuator unit 401 may not include the output shaft rotation angle sensor.

In the above first to third embodiments, for convenience of description, an example has been shown in which a control process of the ECU 15 (215, 315) is described using a flow-driven type flowchart for sequentially executing a process according to a processing flow, and this disclosure is not limited thereto. In this disclosure, the control process of the ECU may be executed by an event-driven type process for executing a process in event units. In this case, the process may be executed in a completely event-driven type, or may be executed by combining the event-driven type and a flow-driven type.

A shift device according to an aspect of this disclosure includes: a shift switching member including a plurality of valley portions corresponding to shift positions; a motor that includes a rotor and a stator and that is configured to drive the shift switching member; and a positioning member configured to establish the shift positions in a state in which the positioning member is fitted into any one of the plurality of valley portions of the shift switching member. The shift device is configured to learn the shift positions based on a change amount of a load torque applied to the motor while the positioning member is moved to continuously pass through the plurality of valley portions.

In the shift device according to an aspect of this disclosure, as described above, the shift positions is learned based on the change amount of the load torque applied to the motor while the positioning member is moved to continuously pass through the plurality of valley portions. Here, the load torque is acquired based on a reluctance torque including the current, a magnet torque including the current, an inertia moment of the rotor not including the current, and an angular acceleration of the rotor not including the current. Accordingly, a ratio of the current contributing to the load torque can be reduced. Since the load torque is acquired based on the angular acceleration and a proportional gain of the rotor, not based on the current, it is possible to eliminate the ratio of the current contributing to the load torque. Accordingly, by reducing or eliminating the ratio of the contribution of the current to the load torque, the ratio of the noise of the current to the load torque can be reduced or eliminated. As a result, it is possible to reduce or eliminate an influence of the noise of the current in the load torque, and thus it is possible to learn (acquire) the shift position with high accuracy as compared with a case in which the shift position is learned using the change amount of the current value as it is. When the load torque is acquired based on the reluctance torque including the current, the magnet torque including the current, the inertia moment of the rotor not including the current, and the angular acceleration of the rotor not including the current, it is possible to estimate a disturbance torque in control based on a difference between an electrical torque acquired by adding the reluctance torque and the magnet torque and a mechanical torque acquired by multiplying the inertia moment of the rotor and the angular acceleration of the rotor. Here, when the load torque is estimated based on a change in the current, only a torque output from the motor can be detected, and thus accuracy of the estimation of the load torque is reduced. As a result, by estimating the load torque based on the difference between the electric torque and the mechanical torque, unlike the case in which the load torque is estimated based on the change in the current, the load torque can be estimated in a state in which a torque required to move the motor is removed from the torque output by the motor, and thus the load torque can be estimated with high accuracy.

In the shift device according to the above aspect, it is preferable that the shift device is configured to learn the shift positions based on a change amount of a disturbance torque in control corresponding to the load torque.

According to this configuration, using the disturbance torque in control to learn the shift position, it is not necessary to provide a sensor that acquires the load torque separately from the disturbance torque, and thus a configuration of the shift device can be simplified.

In this case, it is preferable that, the shift device further includes a transmission mechanism configured to transmit a driving force of the motor to the shift switching member, in which the shift device is configured to detect a width of a backlash provided in the transmission mechanism based on the change amount of the disturbance torque in control, and to learn the shift positions based on the detected width of the backlash.

Here, when control for learning a position where the smallest current value is detected as the shift position is executed, the position where the small current value (the valley portion of the current value) is detected may not be uniquely determined due to the backlash provided in the transmission mechanism. However, as described above, since the shift position can be uniquely learned by learning the shift position using the width of the backlash, the shift position can be reliably acquired.

In the above shift device that learns the shift position based on the detected width of the backlash, it is preferable that the shift device further includes a rotor rotation angle sensor configured to detect a rotation angle of the rotor, in which the shift device is configured to acquire, on the basis that the change amount of the disturbance torque in control changes from a value less than a threshold value to a value equal to or greater than the threshold value when the positioning member moves from each of the plurality of valley portions toward a mountain portion, the rotation angle of the rotor corresponding to an end portion of the width of the backlash, and to acquire the width of the backlash based on the rotation angle of the rotor corresponding to the end portion of the width of the backlash.

According to this configuration, since the end portion of the backlash can be acquired using the threshold value, it is possible to easily acquire the rotation angle of the rotor corresponding to the end portion of the width of the backlash. As a result, since the width of the backlash can be acquired based on the rotation angle of the rotor corresponding to the end portion of the width of the backlash, the width of the backlash can be easily acquired.

In the above shift device that learns the shift position based on the change amount of the disturbance torque in control, it is preferable that the shift device is configured to estimate the disturbance torque in control based on a difference between an electric torque acquired by adding a reluctance torque and a magnet torque and a mechanical torque acquired by multiplying an inertia moment of the rotor and an angular acceleration of the rotor.

According to this configuration, by estimating the disturbance torque in control based on the difference between the electric torque and the mechanical torque, unlike the case in which the control is executed for learning the portion where the small current value (the valley portion of the current value) is detected as the shift position, it is possible to individually learn all the shift positions without offsetting the learned shift position by a predetermined value and learning the other shift positions, and thus it is possible to accurately learn the shift position.

In the above shift device that learns the shift position based on the change amount of the disturbance torque in control, it is preferable that the shift device is configured to estimate the disturbance torque in control based on multiplication of a proportional gain and a steady-state deviation that is a difference between a target angular velocity of the motor and a current speed of the motor in a steady rotation state of the rotor.

According to this configuration, by estimating the disturbance torque in control based on the target angular velocity of the motor and the current speed of the motor, the disturbance torque in control can be estimated without using the current value, and thus the influence of the noise of the current can be eliminated. As a result, the shift position can be learned with higher accuracy. Since a target torque acquired by the multiplication of the proportional gain and the steady-state deviation in the steady rotation state of the rotor can be used as it is as the disturbance torque in control, it is possible to prevent an increase in a processing load in control of the shift device.

The shift device according to the above aspect may be implemented as follows.

Appendix 1

That is, in the above shift device that acquires the end portion of the width of the backlash on the basis that the change amount of the disturbance torque in control changes from a value less than the threshold value to a value equal to or greater than the threshold value, the shift device further includes a temperature detection unit configured to detect a temperature of the motor, and is configured to change the threshold value based on the temperature detected by the temperature detection unit.

According to this configuration, the threshold value can be changed to an appropriate value for the temperature, and thus the end portion of the width of the backlash can be accurately acquired.

Appendix 2

In the above shift device that estimates the disturbance torque in control based on the difference between the electric torque and the mechanical torque, the shift device further includes a filter configured to remove a high-frequency component of the disturbance torque in control that is estimated based on the difference between the electric torque and the mechanical torque.

According to this configuration, the influence of the noise of the current can be further reduced by the filter that removes the high-frequency component, and thus the shift position can be learned with higher accuracy.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift device comprising:
a shift switching member including a plurality of valley portions corresponding to shift positions;
a motor that includes a rotor and a stator and that is configured to drive the shift switching member; and
a positioning member configured to establish the shift positions in a state in which the positioning member is fitted into any one of the plurality of valley portions of the shift switching member, wherein
the shift device is configured to learn the shift positions based on a change amount of a load torque applied to the motor while the positioning member is moved to continuously pass through the plurality of valley portions.

2. The shift device according to claim 1, wherein
the shift device is configured to learn the shift positions based on a change amount of a disturbance torque in control corresponding to the load torque.

3. The shift device according to claim 2, further comprising:
a transmission mechanism configured to transmit a driving force of the motor to the shift switching member, wherein
the shift device is configured to detect a width of a backlash provided in the transmission mechanism based on the change amount of the disturbance torque in control, and to learn the shift positions based on the detected width of the backlash.

4. The shift device according to claim 3, further comprising:
a rotor rotation angle sensor configured to detect a rotation angle of the rotor, wherein
the shift device is configured to acquire, on the basis that the change amount of the disturbance torque in control changes from a value less than a threshold value to a value equal to or greater than the threshold value when the positioning member moves from each of the plurality of valley portions toward a mountain portion, the rotation angle of the rotor corresponding to an end portion of the width of the backlash, and to acquire the width of the backlash based on the rotation angle of the rotor corresponding to the end portion of the width of the backlash.

5. The shift device according to claim 2, wherein
the shift device is configured to estimate the disturbance torque in control based on a difference between an electric torque acquired by adding a reluctance torque and a magnet torque and a mechanical torque acquired by multiplying an inertia moment of the rotor and an angular acceleration of the rotor.

6. The shift device according to claim 2, wherein
the shift device is configured to estimate the disturbance torque in control based on multiplication of a proportional gain and a steady-state deviation that is a difference between a target angular velocity of the motor and a current speed of the motor in a steady rotation state of the rotor.

* * * * *